US005533048A

United States Patent [19]
Dolan

[11] Patent Number: 5,533,048
[45] Date of Patent: Jul. 2, 1996

[54] APPARATUS AND METHOD FOR COMPENSATING FOR LIMITER INDUCED NON-LINEAR DISTORTION IN A WIRELESS DATA COMMUNICATION SYSTEM

[75] Inventor: Michael G. Dolan, Orange, Calif.

[73] Assignee: Celeritas Technologies, Ltd., Irvine, Calif.

[21] Appl. No.: 198,085

[22] Filed: Feb. 17, 1994

Related U.S. Application Data

[63] Continuation-in-part of Ser. No. 147,148, Nov. 3, 1993, which is a continuation-in-part of Ser. No. 99,080, Jul. 28, 1993, Pat. No. 5,386,590.
[51] Int. Cl.$^6$ .............................. H04B 1/38; H04L 27/06
[52] U.S. Cl. ........................ 375/222; 375/316; 375/340
[58] Field of Search ................................. 375/229, 231, 375/261, 222, 223, 358, 224, 225, 296, 346, 377, 285, 345, 371, 295, 298, 316, 340, 226; 379/97, 93, 98

[56] References Cited

U.S. PATENT DOCUMENTS 3,109,991  11/1963  Ocko .
3,111,635  11/1963  Skov et al. .
3,444,469  5/1969   Miyagi .

(List continued on next page.)

FOREIGN PATENT DOCUMENTS 4-68923  3/1992  Japan .
4-77125  3/1992  Japan .

OTHER PUBLICATIONS

Oki Electric Industry Co., Ltd. (Japan): "Proposal For Modem Evaluation System Over Cellular Radio Links," CCITT Study Group IXII, Delayed Contribution D 137, Geneva, Oct. 29–Nov. 6, 1991, pp. 1–4.

Article entitled "Performance Testing of Cellular Modems", by Mike Mukund and Fred Mohajer, from Test & Measurement World, dated Jan. 1993, pp. 63, 64, 66, 68 and 69.
Telebit Corporation: "The Static Characteristics of Analog Cellular Radio Channels And Their Effects Upon Data Transmission," CCITT Study Group XVII, Delayed Contribution D 136, Geneva, Oct. 29–Nov. 6, 1992, pp. 1–11.
EIA Interim Standard, "Recommended Minimum Standards for 800–MHZ Cellular Subscriber Units," EIA/IS–19–B, May 1988.

*Primary Examiner*—Stephen Chin
*Assistant Examiner*—Tesfaldet Bocure
*Attorney, Agent, or Firm*—Knobbe, Martens, Olson & Bear

[57] ABSTRACT

A system and method for reducing amplitude distortion in data signals transmitted via cellular analog communication systems are embodied in several forms. In one embodiment, pre-emphasis and de-emphasis functions of the cellular system are offset by complementary de-emphasis and post-emphasis circuits to preclude clipping of high frequency components of the data signal by the limiter. Alternatively, the limiter circuit is selectively bypassed when a data signal is transmitted. Alternatively, a pilot tone is combined with the incoming data signal. The amplitude of the pilot tone is constant and always sets the gain of the limiter, thereby keeping the gain of the limiter circuit constant. Alternatively, a pair of signals at different frequencies are transmitted on a telephone line, and the relative amplitudes of the return echoes are measured to determine the frequency roll-off of the line and adjust the spectral shaping accordingly. Alternatively, a pair of modems vary their respective spectral characteristics until the eye quality values of the two modems are satisfactory. Alternatively, a receiving modem performs an auto-equalization routine which varies to ignore outer points on a signal constellation that are likely to have a reduced amplitude because of limiting. Alternatively, the threshold amplitudes of an auto-equalizer are varied in accordance with phase changes that correspond to new data points by varying the threshold or by varying the amplitude of the data compared to the threshold.

8 Claims, 20 Drawing Sheets

U.S. PATENT DOCUMENTS

| | | | |
|---|---|---|---|
| 3,517,314 | 6/1970 | Miyagi . | |
| 3,962,638 | 6/1976 | Sallis | 375/223 |
| 4,051,438 | 9/1977 | Pickett et al. | 455/105 |
| 4,053,717 | 10/1977 | Snider | 379/62 |
| 4,110,692 | 8/1978 | Pradal | 455/110 |
| 4,215,431 | 7/1980 | Nady | 455/43 |
| 4,481,547 | 11/1984 | Sato | 360/33.1 |
| 4,578,818 | 3/1986 | Claydon | 452/110 |
| 4,754,230 | 6/1988 | Schwartz et al. | 330/279 |
| 4,802,236 | 1/1989 | Walczak et al. | 455/110 |
| 4,860,336 | 8/1989 | D'Avello et al. | 379/63 |
| 4,893,349 | 1/1990 | Eastmond et al. | 455/205 |
| 4,907,087 | 3/1990 | Schrieber | 348/724 |
| 5,022,053 | 6/1991 | Chung et al. | 375/261 |
| 5,042,085 | 8/1991 | Errico | 455/43 |
| 5,058,202 | 10/1991 | Leveque | 455/43 |
| 5,127,041 | 6/1992 | O'Sullivan | 379/59 |
| 5,148,448 | 9/1992 | Karam et al. | 375/261 |
| 5,168,516 | 12/1992 | Ito | 379/58 |
| 5,204,970 | 4/1993 | Stengel et al. | 455/69 |
| 5,214,641 | 5/1993 | Chen et al. | 370/69.1 |
| 5,226,178 | 7/1993 | Eastmond et al. | 455/23 |
| 5,249,200 | 9/1993 | Chen et al. | 375/285 |
| 5,257,397 | 10/1993 | Barzegar et al. | 455/33.1 |
| 5,297,192 | 3/1994 | Gerszberg | 379/59 |
| 5,388,124 | 2/1995 | Laroia et al. | 375/261 |

APPARATUS AND METHOD FOR COMPENSATING FOR LIMITER INDUCED NON-LINEAR DISTORTION IN A WIRELESS DATA COMMUNICATION SYSTEM

RELATED APPLICATIONS

This application is a continuation-in-part of U.S. patent application Ser. No. 08/147,148 filed on Nov. 3, 1993, which is a continuation-in-part of U.S. Patent application Ser. No. 08/099,080 filed on Jul. 28, 1993, now issued as U.S. Pat. No. 5,386,590 on Jan. 31, 1995 all by the same inventor and assigned to the same assignee as this application.

BACKGROUND OF THE INVENTION

1. Field of the Invention

The present invention relates to radio communication systems, and, more particularly, to an apparatus and method for increasing the data transmission rates within an analog cellular communication device.

2. Description of the Related Art

Radio communication systems have become an important part of the overall communications network in the private, business, and government sectors. Radio communications systems offer a number of significant advantages over wireline or other communications systems. Most significantly, radio communication technology provides substantially greater flexibility than wireline systems, which typically provide communication access at a single geographic location. However, present radio communications systems also have a number of significant limitations as well. Perhaps the most serious limitation to present radio communications systems is the limited amount of data which is able to be transmitted via radio communication.

Many radio frequency bands are presently used for wireless communication systems. For example, the cellular band, police, fire and military bands, business bands, etc. Although the present invention will be described with reference to the analog cellular communication band, it will be understood that the teachings of the present invention apply to all radio frequency transmission.

The limitations observed in the data transmission rate for radio communications systems is especially prevalent in analog cellular communication systems. While modems might appear to connect at a 9600 bit per second modulation rate, actual throughput has typically been achieved at only 200–400 characters per second (as opposed to 960 characters per second as a 9600 bps rate would suggest). The lower throughput exhibited in conventional systems is due to link layer errors and packet retransmission. For an example of the previously attainable bps modulation rates, see an article entitled "New Protocol For Cellular Transfers" published in Communications Weekly, dated Jul. 5, 1993.

Ideally, in order to make radio communication systems a viable alternative to wireline systems in the field of data communication, the data throughput rate over the radio frequency communication system should be at or near the data throughput rate obtainable in wireline systems. Presently, however, the data throughput rate for cellular and other radio frequency communication systems is significantly lower than the data throughput rates obtainable in wireline communication systems. Furthermore, although significant advances have been made to increase the maximum data transmission rate in analog cellular communication systems, the present maximum data transmission rate is well below that needed for certain data communication applications. Specifically, many graphic related data transmission applications require a bit rate in excess of 9,600 bits per second to be viable for commercial use or other important applications. For example, one application involving cellular data transmission uses a cellular modem to transmit graphic images to an emergency vehicle (such as a fire engine) so that, for example, the floor plan of a burning building, and other important information, can be accessed by emergency personnel while in transit. If the graphic information is transmitted at a rate that is too low, the information may not reach the emergency personnel in time to be useful. In addition to emergency applications, an increased data transmission rate is important to the implementation of systems wherein large data files are to be transmitted in a reasonable time and at a reasonable cost. For example, see an article entitled "Better Mobile Network Infrastructure Needed" published in COMPUTERWORLD magazine, dated Jun. 28, 1993. Thus, a plurality of applications exist whose circumstances necessitate increased data transmission rates in order for these communications systems to be viable.

SUMMARY OF THE INVENTION

The present invention provides an improved cellular communication system which increases the maximum available data transmission rate over wireless systems close to that available over conventional wireline systems (i.e., approaching 2,000 characters per second). The inventor has recognized a limitation in present analog cellular communication systems which impedes accurate data transmission utilizing certain commonly used modulation techniques. The present invention compensates for this limitation and provides significantly increased data transmission rates over and above the previously possible maximum data transmission rates.

One aspect of the present invention is an apparatus for increasing the data throughput rate in an analog radio communication system where the radio communication system includes a transmitter having a pre-emphasis function and a limiting function, and a receiver having a de-emphasis function. The apparatus of the present invention includes a de-emphasis located at the input of the transmitter end. The de-emphasizer has spectral shaping characteristics which are substantially opposite the spectral shaping characteristics of the pre-emphasis function in the transmitter so that the de-emphasizer substantially cancels the effect of the pre-emphasis function in the transmitter. A post-emphasizer is located at the output of the receiver. The post-emphasizer has spectral shaping characteristics which are opposite the spectral shaping characteristics of the de-emphasizer function in the receiver so that the post-emphasizer substantially cancels the effect of the de-emphasizer function of the receiver.

Another aspect of the present invention is an apparatus that substantially eliminates amplitude distortion of data signals encoded as a combination of amplitude modulation together with phase modulation, frequency modulation, or multiple frequencies transmitted within a radio communication system. The communication system includes a transmitter having a pre-emphasizer function and a limiting function, and further includes a receiver having a de-emphasizing function. The transmitter transmits signals to the receiver. The apparatus of the present invention comprises a de-emphasizer located at the transmitter that spectrally shapes the data signals and provides the spectrally shaped data signals as inputs to the transmitter to be transmitted to the receiver. A post-emphasizer located at the receiver receives signals from the receiver and spectrally shapes the received signals to reproduce the data signals.

Another aspect of the present invention is a method for eliminating amplitude distortion of data signals having information encoded as a combination of amplitude modulation together with phase modulation, frequency modulation, or multiple frequencies. The encoded data signals are transmitted within a radio communication system that includes a transmitter having a pre-emphasis function and a limiting function and a receiver having a de-emphasis function. The method includes the steps of spectrally shaping the data signal before inputting the data to the transmitter to offset spectral shaping performed by the pre-emphasis function in the transmitter. The method further includes the step of spectrally shaping the data signal to offset the spectral shaping performed by the de-emphasis function in the receiver.

Another aspect of the present invention is a method for increasing the throughput rate of data information transmitted over an analog radio communication system having a transmitter and a receiver. The transmitter has a pre-emphasis function and a limiting function and the receiver has a de-emphasis function. The method includes the steps of determining whether voice or data is being transmitted, and enabling a limiter compensation function if data is being transmitted. The limiter compensation function operates to cause the effective gain of the limiter function in the transmitter to be constant.

Another aspect of the invention is a method for increasing the throughput rate of data information transmitted over an analog radio communication system having a transmitter and a receiver, wherein the transmitter has a pre-emphasis function and a limiting function and the receiver has a de-emphasis function. The method includes the step of signal processing the data information to produce an output signal at the receiver which is substantially the same as a signal which would be present at the receiver if the effective gain of the limiting function were constant.

Another aspect of the present invention is a method for increasing the throughput rate of data information transmitted over an analog radio communication system having a transmitter and a receiver, wherein the transmitter has a pre-emphasis function and a limiting function and the receiver has a de-emphasis function. The method includes the step of bypassing the limiting function when the transmitted information is data.

Another aspect of the present invention is an apparatus for increasing the throughput rate of data information transmitted over an analog radio communication system having a transmitter and a receiver, wherein the transmitter has a pre-emphasis function and a limiting function and the receiver has a de-emphasis function. The apparatus includes a limiter compensation function which maintains the gain of the limiting function constant when the information transmitted over the radio communication system is data information.

Another aspect of the present invention is an apparatus for increasing the throughput rate of data information transmitted over an analog radio communication system having a transmitter and a receiver, wherein the transmitter has a pre-emphasis function and a limiting function and the receiver has a de-emphasis function. The apparatus includes a de-emphasizer located at the transmitter which cancels the effect of the pre-emphasis function within the transmitter which is enabled when data is transmitted over the communication system. The apparatus further includes a post-emphasizer located at the receiver which cancels the effect of the de-emphasis function within the receiver which is enabled when data is transmitted over the communication system.

Another aspect of the present invention is an apparatus for reducing amplitude distortion in data signals transmitted via a radio communication system that communicates both voice and data signals, wherein the communication system includes a transmitter having a pre-emphasis function and a limiting function, and includes a receiver having a de-emphasis function. The transmitter transmits signals to the receiver. The apparatus includes a pilot signal generator that generates a constant amplitude, constant frequency pilot tone, and a combiner circuit that combines the data signal with the pilot tone to form a composite signal having a data component and a pilot component. The composite signal is provided as an input to the transmitter such that the gain of the limiting function in the transmitter is maintained constant due to the pilot component of the composite signal. The apparatus further includes a filter that receives a receiver output signal from the receiver and that filters out the pilot component of the composite signals received by the receiver from the transmitter. Preferably, the filter is a notch filter having a notch at the frequency of the pilot tone.

Another aspect of the present invention is a method for improving the data transmission characteristics of a modem connected to a central office via a telephone line. The spectral characteristics of the telephone line may vary from call to call, and the spectral characteristics of signals transmitted by the modem can be varied. The method comprises the step of transmitting a first signal from the modem to the central office. The first signal has a first frequency and a first transmitted amplitude. The method includes the further step of transmitting a second signal from the modem to the central office. The second signal has a second frequency greater than the first frequency and has a second transmitted amplitude. The method includes the step of receiving a first echo by the modem from the central office. The first echo has a first received amplitude responsive to the first transmitted amplitude and further responsive to attenuation characteristics of the telephone line at the first frequency. The method further includes the step of receiving a second echo by the modem from the central office. The second echo has a second received amplitude responsive to the second transmitted amplitude and further responsive to attenuation characteristics of the telephone line at the second frequency. The method includes the step of calculating a frequency roll-off between the first and second frequencies based upon the first received amplitude and the second received amplitude. The method includes the step of adjusting spectral characteristics of the signals transmitted by the modem to compensate for the frequency roll-off. Preferably, in the method in accordance with this aspect of the invention, the first and second transmitted amplitudes are substantially equal.

Another aspect of the present invention is a method of adjusting spectral characteristics of a first modem that transmits data signals to a second modem via a communication link wherein at least one portion of the communication link includes a telephone line having unknown spectral characteristics. The data signals comprise amplitude and phase modulation of at least one carrier signal. The amplitude and phase modulation form a signal constellation at the second modem wherein predetermined points on the signal constellation represent combinations of binary data. The predetermined points have varying phases and amplitudes in the presence of nonideal spectral characteristics of the communication link. The method comprises the steps of measuring an eye quality of the signal constellation at the second modem. The eye quality is a value that represents a measure of a deviation of measured points on the signal constellation for a combination of binary data from an ideal point on the signal constellation for the combination of binary data. The method includes the step of communicating the eye quality value from the second modem to the first modem, and adjusting spectral characteristics of the data signals transmitted from the first modem to the second modem while monitoring the eye quality value from the second modem. The method further includes the step of selecting spectral characteristics of the data signals transmitted from the first modem to the second modem that result in a preferred eye quality value. Preferably, the preferred eye quality value is the highest eye quality value measured by the second modem while the spectral characteristics are adjusted.

Another aspect of the invention is a method of compensating for varying spectral characteristics of data signals received by a first modem from a second modem via an analog communications link. The data signals comprise amplitude and phase modulation of at least one carrier signal. The amplitude and phase modulation form a signal constellation at the second modem wherein predetermined points on the signal constellation represent combinations of binary data. The signal constellation includes points having varying phases and amplitudes that differ from phases and amplitudes of the predetermined points in the presence of non-ideal spectral characteristics of the communication link between the second modem and the first modem. The non-ideal spectral characteristics include non-linear amplitude limiting of portions of the data signals. The method comprises the steps of generating the data signal constellation in the first modem to provide a first plurality of data points having respective amplitudes and phases, and detecting a second plurality of points included in the first plurality of points having amplitudes that differ sufficiently from the predetermined points to indicate that amplitudes of data signals that generated the second plurality of points have been non-linearly limited. The method includes the further steps of calculating spectral shaping characteristics for the first modem using amplitude measurements from a third plurality of points that are included in the first plurality of points but not included in the second plurality of points, and modifying the spectral shaping characteristics of the first modem so that the third plurality of points have phases and amplitudes that more closely correspond to phases and amplitudes of the predetermined points. Preferably, the step of calculating spectral shaping characteristics further includes the step of multiplying the amplitude of one of the second plurality of points by a factor that varies in accordance with a phase change between the one of the second plurality of points and a previous point to generate a modified amplitude. The modified amplitude is used to calculate the spectral shaping characteristics.

Another aspect of the present invention is a method of establishing amplitude thresholds in a data signal constellation of a first modem that receives data signals from a second modem via an analog communications link. The data signals comprise amplitude and phase modulation of at least one carrier signal. The amplitude and phase modulation form the data signal constellation at the first modem wherein predetermined points on the data signal constellation represent combinations of binary data. The first modem establishes a plurality of amplitude thresholds on the data signal constellation between points having like phases and different amplitudes wherein a point having an amplitude less than one of the thresholds is recognized by the modem as a first data combination and wherein a point having an amplitude greater than the one of the thresholds is recognized as a second data combination. The plurality of amplitude thresholds are substantially midway between amplitudes of adjacent points at like phases. The data signal constellation includes points having varying phases and amplitudes that differ from phases and amplitudes of the predetermined points in the presence of non-ideal spectral characteristics of the communication link. The non-ideal spectral characteristics include non-linear amplitude limiting of portions of the data signals. The method comprises the steps of measuring amplitudes and phase changes for known data combinations having predictable predetermined amplitudes and phase changes, and determining a range of measured amplitudes for each predictable amplitude for each phase change. The method includes the further steps of establishing a respective new threshold value for each predictable predetermined amplitude so that the new threshold value is below the lower limit of the range of measured amplitudes for the predictable predetermined amplitude and above the upper limit of the range of measured amplitudes for an adjacent point at a lower predictable predetermined amplitude, and using the new threshold values when receiving unknown data from the second modem to determine which of the predetermined points is represented by the unknown data.

Another aspect of the present invention is a method of discriminating data points in a signal constellation. The signal constellation has ideal points at various phases and amplitudes. The signal constellation has a configuration that depends upon the data exchange rate between a transmitting modem and a receiving modem. The transmitting modem and the receiving modem communicate over a communication link having non-ideal characteristics resulting in amplitude deviations of the data points from the ideal points. The method comprises the steps of establishing a signal constellation configuration having inner and outer ideal points corresponding to lesser and greater amplitudes, respectively, at various phase angles, and transmitting data having phase and amplitude characteristics from the transmitting modem to the receiving modem. The method further includes the steps of assigning data point positions in the signal constellation to the data based upon the phase, and amplitude characteristics, and measuring the amplitude deviations of the data points from the ideal points. The method includes the further steps of dynamically adjusting an amplitude threshold value between the inner and outer points based upon the measured amplitude deviations of the data points from the inner and outer points to generate adjusted thresholds, and assigning data points of incoming data to ideal constellation points based upon the dynamically adjusted thresholds. Preferably, each of the dynamically adjusted thresholds is selected so that a ratio of an amplitude difference between a respective ideal inner point and the threshold to an amplitude difference between the threshold and a respective ideal outer point is substantially equal to a ratio between a standard deviation of the measured inner data points from the ideal inner point to a standard deviation of the measured outer data points from the ideal outer point. Also, preferably, the step of measuring the amplitude deviations comprises the step of sending known data from the transmitting modem to the receiving modem so that the ideal inner points and the ideal outer points are predictable.

Another aspect of the present invention is a method of compensating for varying spectral characteristics of data signals received by a first modem from a second modem via an analog communications link wherein the data signals comprise amplitude and phase modulation of at least one carrier signal. The amplitude and phase modulation form a signal constellation at the first modem wherein predetermined points on the signal constellation represent combinations of binary data. The signal constellation comprises outer points and inner points. The outer points have greater amplitudes than the inner points. The signal constellation includes points having varying phases and amplitudes that differ from phases and amplitudes of the predetermined points in the presence of non-ideal spectral characteristics of the communication link between the second modem and the first modem. The non-ideal spectral characteristics include non-linear amplitude limiting of portions of the data signal. The method includes the step of generating the data signal constellation in the first modem to provide a first plurality of data points having respective amplitudes and phases. The first plurality of points comprise the inner and outer points. The method further includes the step of identifying a second plurality of the first plurality of points. The second plurality of points comprise selected ones of the outer points resulting from phase changes greater than a selected phase change. The second plurality of points have amplitudes likely to have been limited. The method includes the step of identifying a third plurality of points. The third plurality of points comprise points included in the first plurality of points but not included in the second plurality of points. The method performs auto-equalization on the third plurality of points. The auto-equalization is thus performed without being substantially affected by amplitudes of the second plurality of points.

DETAILED DESCRIPTION OF THE INVENTION

The inventor of the present system and method has recognized a limitation in conventional cellular voice communication systems which severely restricts the data bit rate capacity of an ordinary cellular communications channel. The problem which limits the data transmission rate of current cellular systems, as well as the general solution provided by the teachings of the present invention, will be outlined and discussed with reference to FIG. 1.

Figure 1:
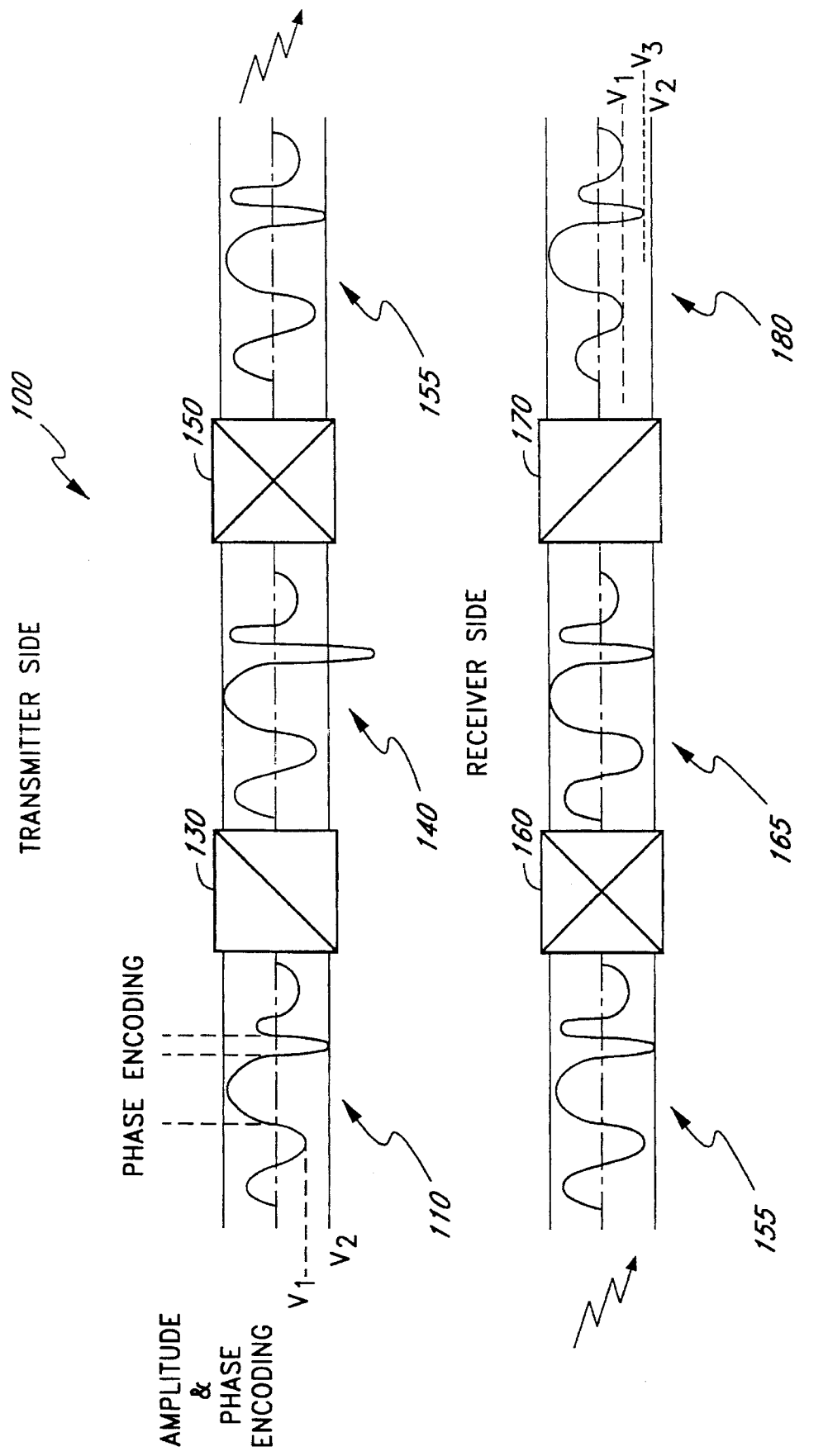
FIG. 1 is a system block diagram schematically showing the waveforms and functional system blocks associated with a conventional analog cellular communication system.

FIG. 1 is a diagram which represents data communication signals during different stages of transmission within a conventional analog cellular communication system 100. As shown in FIG. 1, in order to maximize data carrying capacity, a data transmission signal 110 is typically encoded with information by means of both amplitude and frequency or phase modulation techniques. As is well known in the art, this technique is called quadrature amplitude modulation (QAM). Although the signal 110 is described as a phase encoded signal, it should be understood that the present invention applies to amplitude modulated signals which are simultaneously encoded onto multiple different carrier frequencies as well. Thus, references to amplitude and phase modulation may also be understood to refer to amplitude and other combinations of frequency, phase, or multiple carrier frequency modulation techniques. A number of QAM modulation techniques are currently used such as V.32, V.32 bis, V.29, and others which modulate on the basis of both phase and amplitude. These amplitude values and phase differences are interpreted as data bits (i.e., binary "1's" or "0's"). It should be understood that the signal 110 is simplified for ease of illustration, and may not correspond to an actually encoded data signal used in present modulation techniques. Furthermore, data scrambling techniques are typically employed in conjunction with most high capacity data modulation techniques, so that any given waveform would not always represent the same bit pattern.

Common to most high capacity data modulation techniques is the combination of phase and amplitude modulation. In some of the more recent data transmission protocols several bits may be encoded by means of amplitude modulation. For example, in Packetized Ensemble Protocol (PEP) modulation, which allows a data transmission rate of up to 23,000 bits per second, a technique is employed wherein as many as 512 separate carriers are used simultaneously during data transmission and up to seven amplitude levels are also defined for each carrier frequency as a means to encode data. Thus, when employing such high capacity data transmission protocols, it is important to provide accurate amplitude detection at the receiving end. A failure to accurately discriminate voltage amplitude levels in these systems results in unacceptable bit error rates. It has been found by the inventor of the present system and method, that conventional analog cellular communication systems operate in a manner that distorts the amplitude element of data signals and thereby impairs the utilization of high data capacity protocols.

Conventional analog cellular communication systems are designed to transmit voice information over radio frequency channels. In order to reduce the effects of noise during communication, these systems include pre-emphasis and de-emphasis functions at the transmitting and receiving ends, respectively. Typically, interference due to noise in voice communication is experienced as a hiss in the high frequency band. Therefore, in order to increase the signal-to-noise ratio in this frequency range, the signal to be transmitted is pre-emphasized at the high frequency range, and is later de-emphasized in the same frequency spectrum at the receiving end. This pre-emphasis technique results in a reduction of high frequency noise, and therefore an improvement in voice quality.

FIG. 1 shows the main spectral shaping steps performed during transmission of a data signal. The data signal 110, which is encoded by means of both amplitude and phase modulation, initially enters a pre-emphasizer 130. As depicted in FIG. 1, the signal 110 is amplitude and phase encoded by distinct quantities so that there are no ambiguous voltage levels or phase shifts. The pre-emphasizer 130 amplifies the high frequency component of the signal 110 to produce an output signal 140. The pre-emphasized signal 140 enters a compressor or limiter 150. In many cellular communication systems, the compressor or limiter 150, together with an expander circuit 160, comprises a compander circuit which has a variable gain for compression and subsequent expansion of the dynamic range of the signal 140. The function of limiting may be performed by the compander or by external circuitry. For purposes of the following description the limiter 150 should be understood to perform the combined functions of limiting and compression. In order to meet the requirements of the cellular industry standard, the limiter 150 typically has a 2:1 compression factor, as is well understood in the art.

The limiter 150 performs a dual function as described herein. First, the limiter 150 provides dynamic range compression to increase the signal to noise ratio of low voltage signals, as is well known in the art. Second, the limiter 150 is provided to compensate for signals having amplitudes that exceed established threshold levels. When a data signal is modulated onto a carrier frequency in an FM analog cellular system, the amplitude of the data signal is encoded as variations in the carrier frequency. The larger the signal amplitude is, the greater the frequency variation. Because each channel of the cellular system has an assigned frequency bandwidth, it is important that the carrier signal not exceed this bandwidth so that interference with neighboring signals is avoided. Therefore, cellular communication systems must insure that the amplitude of the signal to be transmitted is below a given amplitude. Due to the large and sudden variations typically observed in voice communication, conventional cellular communication systems include a limiter function (sometimes implemented as a compression amplifier). The limiter circuit 150 is provided so that when, for example, a person suddenly shouts, the amplitude of the signal to be transmitted does not exceed the allowed amplitude threshold (in this case V2). The limiter circuit 150 detects the voltage level of the incoming signal 140 and adjusts its own gain to reduce the amplitude of the signal 140 so that an output signal 155 has a maximum output voltage which is less than or equal to the allowed threshold amplitude. Thus, the high frequency components of the data signal 140 which were pre-emphasized to an amplitude above the threshold voltage V2 are limited, or clipped, as shown in the output signal 155. The effect of the limiter circuit 150 is substantially imperceptible in voice communication, but significantly impairs the usability of the cellular system for data transmission.

The dual function of the limiter 150 may be accomplished by a number of different circuit schemes which typically involve limiting by means of compression, clipping, or the like. However, the overall amplitude distortion effect of the limiter 150 remains essentially the same for the various implementations of the limiter 150, so that the teachings of the present invention are applicable universally to substantially all such implementations of the limiter circuit 150.

Although not represented in the output signal 155 shown in FIG. 1, the limiter 150 has a nominal attack time of 3 ms and recovery time of 13.5 ms, as mandated by industry standard. Therefore, if the gain of the limiter circuit 150 is continuously changing, significant amplitude distortion may occur in the data signals immediately following (i.e., within 13.5 ms) a sudden change of limiter gain. Therefore, it is desirable to maintain a nearly constant limiter gain.

Once the signal 155 leaves the limiter 150, the signal 155 is modulated onto the carrier signal (not represented in FIG. 1), and transmitted to a receiver having the expander circuit 160. The expander circuit 160 performs complementary operations to the limiter 150. That is, the expander 160 increases the dynamic range of the signal 155 by an expansion factor of 2:1, as is well known in the art. As can be seen in an output signal 165, however, the expander 160 does not compensate for the clipped high frequency portion of the signal 155, so that the high frequency component of the signal 165 remains clipped at the threshold voltage. The signal 165 enters a de-emphasizer circuit 170.

The de-emphasizer 170 attenuates the high frequency components of the signal 165 to output a received signal 180. As can be seen from the results of the transmission, the amplitude component of the original signal 110 has been distorted so that a high frequency component of the signal 180 has an ambiguous voltage amplitude V3. Because the receiving modem evaluates the amplitude of the signal 180 to determine part of the bit pattern encoded by the signal 180, a distortion in this amplitude resulting in an ambiguous voltage level may result in an erroneous bit detection, or modem malfunction. Thus, using the conventional cellular communication system 100, when data is transmitted in a modulation format which depends upon accurate amplitude discrimination, errors in the encoded data bits result.

The primary difficulty observed in this system is that the limiter 150 has a variable gain which sometimes introduces severe amplitude distortion in the encoded data signal 110. Because the gain of the limiter 150 varies as a function of the amplitude of the input voltage, conventional amplification circuits are not able to compensate for the amplitude distortion introduced by the limiter 150. In accordance with the teachings of the present invention, several devices and methods are proposed for compensating for the amplitude distortion introduced by the limiter 150 during data transmission.

Figure 2:
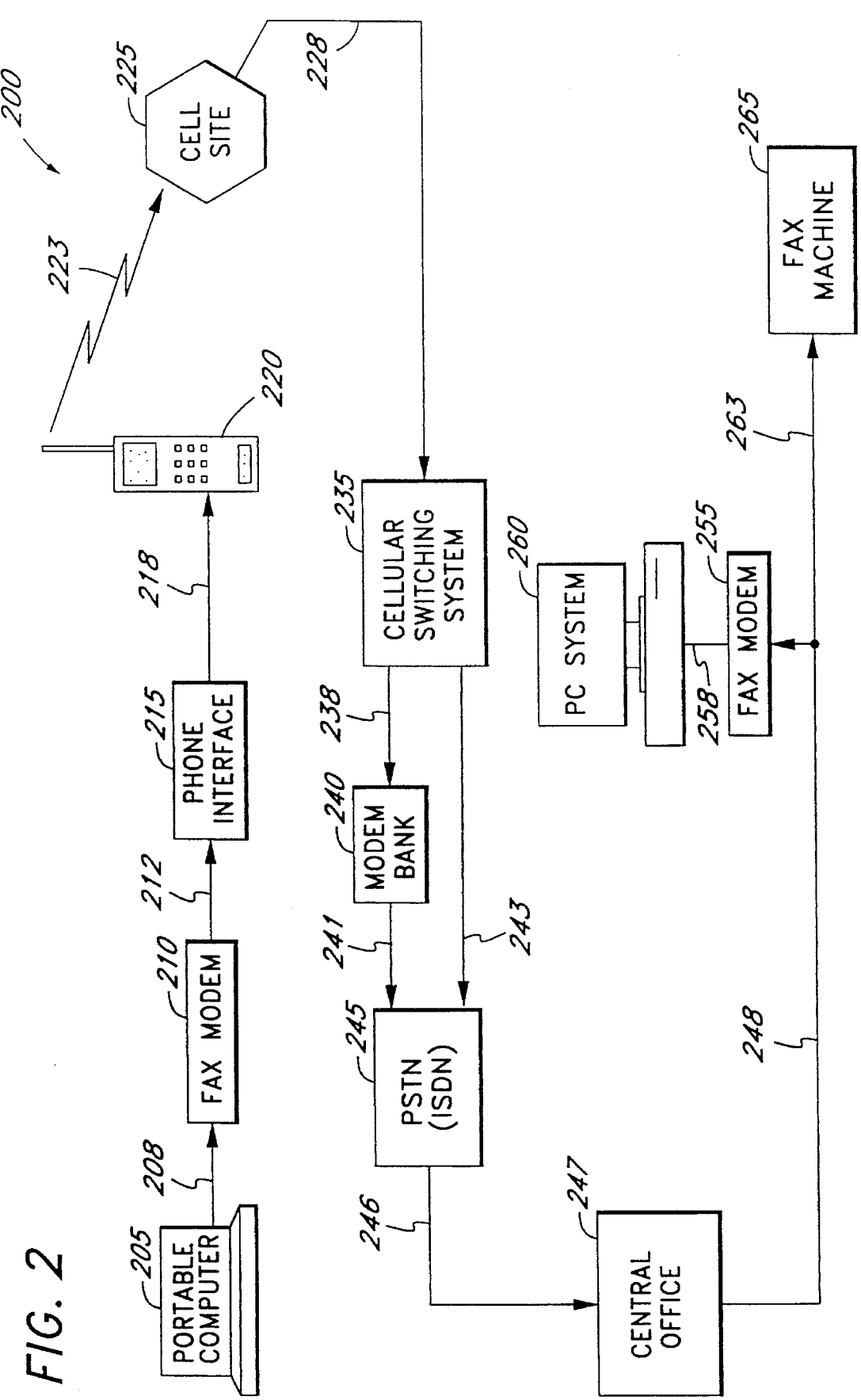
FIG. 2 is a simplified schematic diagram which represents most of the main structural elements of a conventional analog cellular communication system as connected during data transmission.

FIG. 2 is a simplified schematic diagram which represents most of the main structural elements of an analog cellular communication system 200. The cellular communication system 200 includes a portable computer 205 which may include a plurality of peripheral devices, such as a hard disk memory unit, a printer, etc. (not shown). In one embodiment, the computer 205 comprises an IBM PC compatible laptop computer. The computer 205 communicates with a FAX modem 210 via a communication link 208. The FAX modem 210 may, for example, be embodied as an AT&T Paradyne "Keep-in-Touch" modem, or a MICROCOM Microport modem. It will be appreciated by one of ordinary skill in the art that the FAX modem 210 may comprise a data modem, a FAX, or a combination of a FAX and data modem as well. The FAX modem 210 connects to a telephone interface 215 via a line 212. The telephone interface 215 may be embodied as a Cellular Connection interface, available from MOTOROLA. The interface 215 connects to a cellular telephone 220 via a link 218. The cellular telephone 220 may, for example, comprise a Micro-Tac cellular telephone, available from MOTOROLA.

The cellular telephone 220 communicates with a cell site 225 via radio transmission link 223. The cell site 225 includes receiving circuitry, such as a plurality of cellular radios (not shown) for acquiring voice or data information transmitted by the cellular telephone 220. The cell site 225 passes the acquired information to a cellular switching system 235 via a T–1 transmission link 228 which may, for example, comprise a land line or a microwave link. The cellular switching system 235 may connect directly to a modem bank 240 via a line 238, and then to a Public Switch Telephone Network (PSTN) 245 via a line 241. The cellular switching system 235 may either send information directly to the PSTN 245 via a line 243, or first send the information to the modem bank 240 which subsequently transfers the information to the PSTN 245 via a line 241.

The PSTN 245 communicates with a central office 247 via a communication link 246. The central telephone office 247 may perform certain upkeep and monitoring operations. The central telephone office 247 connects with a FAX modem 255 via line 248, or directly to a facsimile machine 265 via a line 263. As with the modem 210, the FAX modem 255 comprises an AT&T Paradyne "Keep-in-Touch" modem, or a MICROCOM Microport modem in one embodiment. Similarly, the FAX modem 255 may comprise a data modem, a FAX, or a combination of a FAX and data modem as well. The FAX modem 255 which may be a single modem (or a rack of modems) connects to a computer 260 via a communications link 258. The computer 260 also comprises one of a plurality of computers such as an IBM PC or Laptop computer, while the facsimile machine 265 may comprise a FUJITSU DEX 720, in one embodiment.

In operation, the cellular communication system 200 provides two way communication between the portable computer 205 and the computer 260. The computer 205 stores data files and executes programs. The computer 205 also has an appropriate interface protocol which allows for interface with the FAX modem 210. In one embodiment, the FAX modem 210 is internal to the computer 205, either by attachment to the motherboard, or by connection with the PCMCIA slot. In another embodiment, the modem 210 is external, and the RS 232 serial port is used to connect the computer 205 with the FAX modem 210. The FAX modem 210 converts digital data output by the computer 205 to analog data suitable for transmission over an analog cellular telephone communication link. The FAX modem 210 also converts incoming analog data into digital data suitable for input to the computer 205. The FAX modem 210 sends analog data to the telephone interface 215, which provides tip and ring functions to make the cellular telephone 220 appear like a regular telephone line (e.g., the interface 215 provides a dial tone, etc.).

The cellular telephone 220 includes radio transmitter circuitry including a pre-emphasis function and a limiter function such as those described in FIG. 1. The cellular telephone 220 transmits an analog data radio signal to a local cell site (i.e., the cell site 225). The cell site 225 receives the signal provided by the telephone 220 and transmits this signal to the cellular switching system 235 by means of a T–1 link which may be wireline or microwave. The cellular switching system 235 is a part of a mobile telephone switching office (MTSO), and performs channel routing functions, etc. During normal operation, the cellular switching system sends communication signals to the PSTN 245 via communication link 243. However, optionally, the cellular switching system 235 transfers communication signals to the modem bank 240, wherein modem and FAX data translation operations, as well as storage and forward functions may be performed. Once the communication signal is provided to the PSTN 245 by either the switching network 235 or the modem bank 240, the PSTN 245 transmits the communication signal in digital format to the central office 247. The central office 247 performs local call routing operations as well as performing digital to analog conversion. The communication signal is routed either to the modem 255 or directly to the facsimile machine 265. If the signal is transmitted to the modem 255, then the modem 255 transmits the signal to the computer 260 for further processing and display.

It should be noted that if voice information is to be communicated, the parties would simply use the telephone 220, and a telephone (not shown) connected on the receiving end. Furthermore, it should be understood that, although the data communication between the computer 205 and the computer 260 is described as unidirectional (from the computer 205 to the computer 260), the system 200 allows for bi-directional communication. Finally, one of ordinary skill in the art will recognize that either one side or both sides of the cellular communication system 200 can be embodied as a cellular transmitter/receiver. Thus, via the cellular communication system 200, binary data and other information can be transmitted from or to a computer and/or facsimile device by means of radio transmission.

In accordance with the present invention, compensation for amplitude distortion produced by the limiter 150 may be effected at a plurality of different locations along the cellular communication system 200, by several techniques. Each of the techniques used to compensate for the amplitude distortion produced by the limiter 150 ultimately look to the same end. Namely, to modify the communication signal or the limiter 150 so that the net effect of the limiter 150 is to produce a gain which remains constant throughout data transmission.

Figure 3:
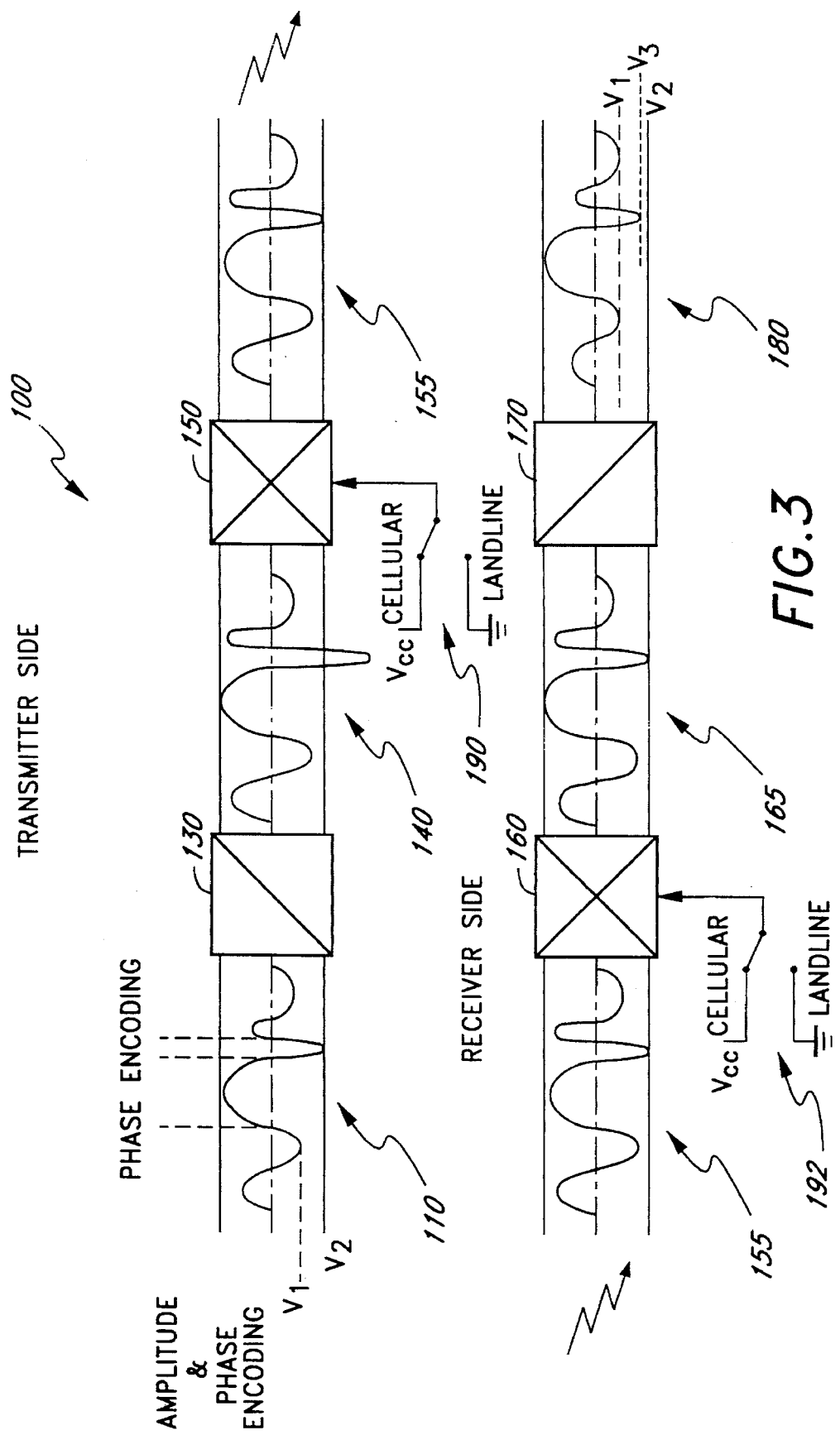
FIG. 3 is a system block diagram schematically showing the waveforms and functional system blocks associated with a cellular communication system which provides a limiter bypass mechanism in accordance with the teachings of the present invention.

The present invention is activated to maintain an effectively constant limiter gain. First, one embodiment of the present invention, shown in FIG. 3, responds (manually or automatically) to the detection of data information transmitted over radio frequency and activates disable or bypass circuits 190, 192 to bypass the limiter 150 and the expander 160, respectively. The limiter 150 is not needed during data transmission because the amplitude of the data signal is substantially constant throughout transmission. Of course, it may be necessary to insert a constant gain attenuation circuit into the bypass circuits 190, 192 in order to compensate for the high frequency amplification caused by the pre-emphasis circuit 130. A second way to accomplish substantially the same result is to set, or lock-in, the gain of the limiter circuit 150 to a constant level in response to a detection of an incoming data information signal. Although these are relatively straightforward solutions, it may be impractical to implement these solutions in some applications due to the requirement that the internal circuitry of the cellular telephone 220 be internally altered, and that the cell site 225 also be altered. This may pose significant problems since the current industry standard mandates a limiter circuit. Furthermore, because of the large quantities of existing cellular systems and because manufacturers or cellular network operators may not be willing to retroactively implement this change in all of their equipment and in customer cellular telephones, a preferred embodiment of the present invention, described below, can be used with existing systems without modifying the systems.

Alternatively, in another embodiment of the invention (not shown), only the limiting function of the limiter 150, and not the compression function of the limiter 150, is disabled by the bypass switch 190. In this alternative embodiment, the switch 192 in the receiver is not necessary because the expander 160 will still be used.

The De-emphasis/Post-emphasis Circuit

Figure 4:
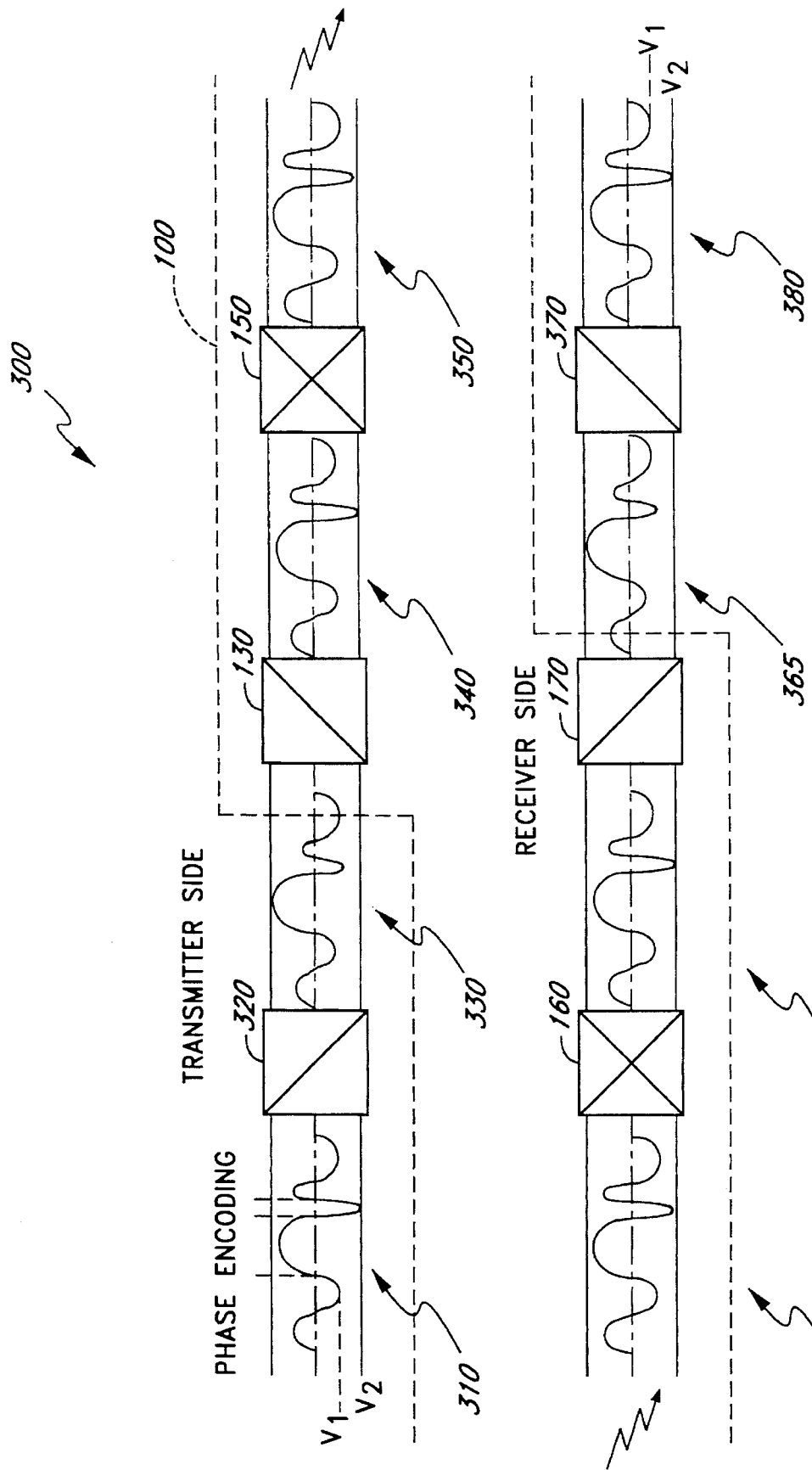
FIG. 4 is a system block diagram schematically showing the waveforms and functional system blocks associated with an improved cellular data transmission system constructed in accordance with the present invention.

FIG. 4 is a schematic representation of an improved cellular data transmission system 300 constructed in accordance with the present invention. The system 300 includes a transmitter end de-emphasizer 320, the pre-emphasis circuit 130, the limiter 150, the expander 160, the receiver end de-emphasizer 170, and a post-emphasizer 370. The pre-emphasis circuit 130, the limiter 150, the expander 160, and the de-emphasizer 170 are the same elements that formed part of the cellular transmission system 100 shown in FIG. 1.

Because data information signals, unlike voice information signals, typically do not have sudden amplitude variations, the gain of the limiter circuit 150 can be held constant during data transmission so that there is no amplitude distortion introduced by the limiter 150. As will be described with reference to FIG. 4, one method of effectively maintaining a constant gain of the limiter 150 is to cancel the pre-emphasis provided by the pre-emphasis circuit 130. The effects of the de-emphasizer 170 are also offset to restore the original signal.

A data communication signal 310, which is encoded by phase and amplitude modulation techniques (or another combination as discussed above with reference to the signal 110), enters the transmitting end de-emphasis circuit 320. In one embodiment, the spectral shaping characteristics of the de-emphasis circuit 320 are such that the high frequency components of the signal 310 are attenuated at a rate of 6 dB/octave to offset the gain of the pre-emphasis circuit 130 that is imposed in accordance with the cellular industry standard. For example, a 1 kHz frequency component would be attenuated by 6 dB more than a 500 Hz frequency component, while a 2 Hz frequency component would be attenuated by 6 dB more than the 1 kHz frequency component. The output of the de-emphasis circuit 320 is represented by a signal 330, having an attenuated high frequency component. The signal 330 enters the pre-emphasis circuit 130 which has spectral shaping characteristics which are complementary to the characteristics of the de-emphasis circuit 320. That is, the pre-emphasis circuit 130 amplifies the high frequency components of the input signal 330 at a rate of 6 dB/octave, so that a 1 kHz frequency component would be amplified by 6 dB more than a 500 Hz frequency component and so on. Therefore, a signal 340 output from the pre-emphasis circuit 130 has substantially the same amplitude characteristics as the original signal 310 input to the de-emphasis circuit 320.

The signal 340 enters the input of the limiter 150. Because the maximum amplitude of the original signal 310 is normally less than or equal to the maximum amplitude threshold allowed by the limiter 150, the limiter 150 does not clip or attenuate the incoming signal 340. Rather, the signal 340 is allowed to pass through the limiter 150 so that the dynamic range of the signal 340 is compressed, without clipping any portion of the signal 340. A signal 350 represents the output of the limiter 150.

The signal 350 is then modulated onto a carrier, and transmitted to a receiver side of the system 300, as is well understood in the art. Assuming that the transmission of the signal 350 to the receiver side and the detection of the signal 350 at the receiver side introduces no significant amplitude or phase distortion, substantially the same signal 350 enters the expander 160 as shown in the lower portion of FIG. 4. The expander 160 expands the dynamic range of the signal 350 so that the amplitude characteristics of a signal 360 output from the expander 160 are substantially the same as the amplitude characteristics of the signal 340 input to the limiter 150. The signal 360 subsequently enters the receiver end de-emphasis circuit 170. The de-emphasis circuit 170 advantageously has similar spectral shaping characteristics to the de-emphasis circuit 320, since the de-emphasis circuit 170 performs complementary operations to the pre-emphasis circuit 130. The de-emphasis circuit 170 outputs a signal 365 which has attenuated high frequency components. Finally, the signal 365 enters a post-emphasis circuit 370, which performs the function of reversing the effects on the signal 365 due to the receiver end de-emphasis circuit 170. Thus, like the pre-emphasis circuit 130, the post-emphasis circuit 370 amplifies the incoming signal at a rate of 6 dB/octave. Therefore, a signal 380, output by the post-emphasis circuit 370 has substantially the same amplitude characteristics as the signals 360 and 340, and thereby, as the original input signal 310. Therefore, the improved cellular data transmission system 300 provides for accurate amplitude discrimination of transmitted signals so that both the amplitude and phase characteristics of the transmitted signal are preserved. While a post-emphasizer is described throughout the specification, one skilled in the art will recognize that a similar function may be performed by an auto-equalizer provided as part of most commercially available high-speed modems. Many of such auto-equalizers may not have a sufficient dynamic range to accomplish this function, in which cases the postemphasis circuit is necessary.

It should be noted that the cancellation of the spectral shaping performed by the pre-emphasis circuit 130 and the de-emphasis circuit 170 results in a reduced signal to noise ratio within the high frequency components of the received signal. However, the increased hissing noise found at the high frequency end, although sometimes bothersome when listening to a voice communication, does not significantly interfere with data transmission.

Although the operation of the improved cellular data transmission system 300 has been described as a uni-directional communication system, it should be understood than an actual implementation of the system 300 is preferably in full duplex to allow simultaneous bi-directional communication. Thus, each side of the system 300 will have all of the components shown in FIG. 4 since each side will carry out both transmitting and receiving operations.

In order to implement the improved cellular transmission system 300, it is merely required to add the de-emphasis circuit 320 to the transmitter side, and the post-emphasis circuit 370 to the receiver side of the conventional cellular transmission system 100 already in place. Of course, since the system 300 is bi-directional, both the de-emphasis circuit 320 and the post-emphasis circuit 370 are preferably implemented on each end in series with the signal path.

Figure 5A:
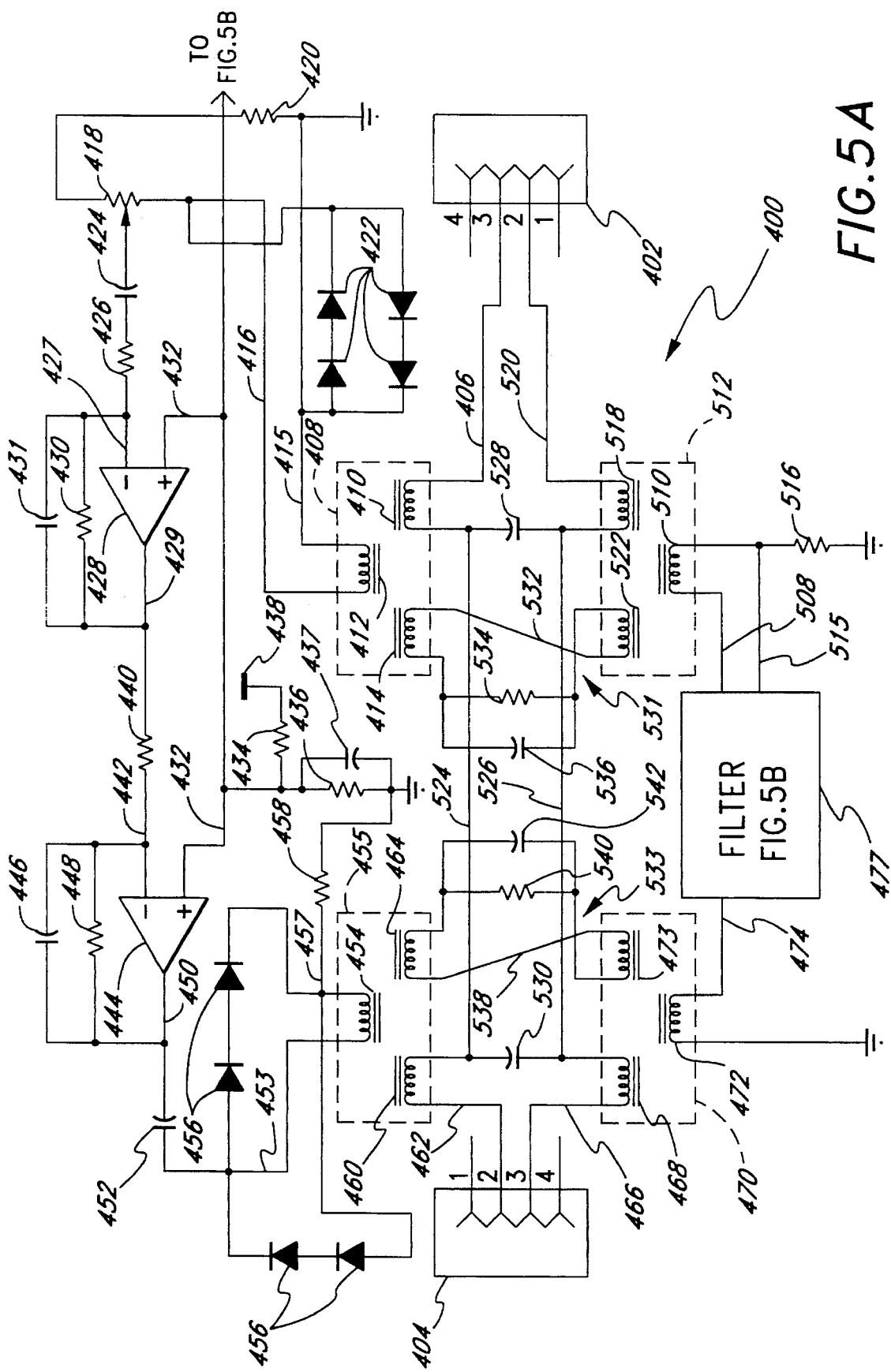
FIGS. 5A and 5B are schematic diagrams which detail the specific circuitry used in an actual embodiment of a circuit including both the de-emphasis circuit and the post-emphasis circuit.
Figure 5B:
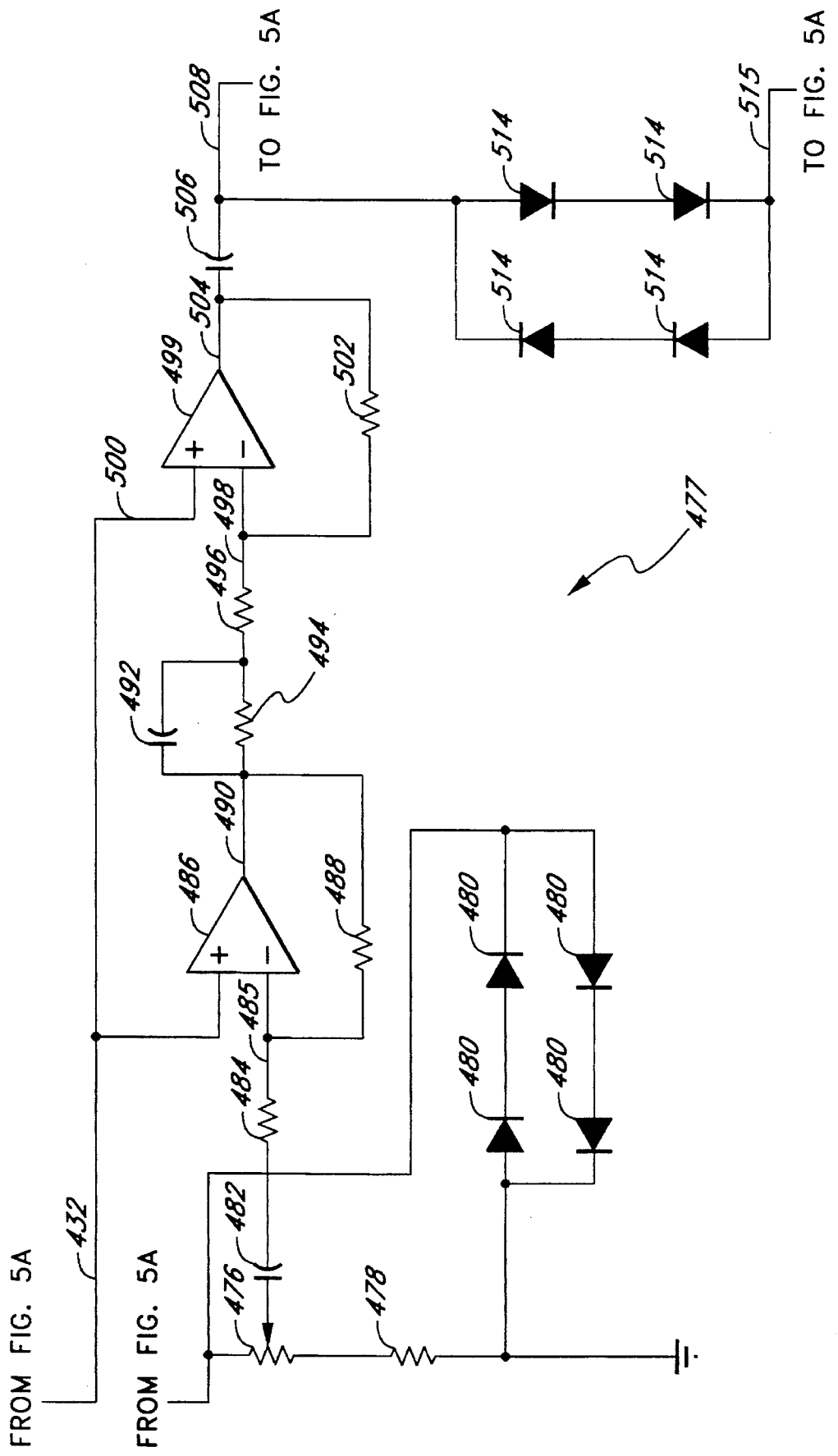
Figure 6:
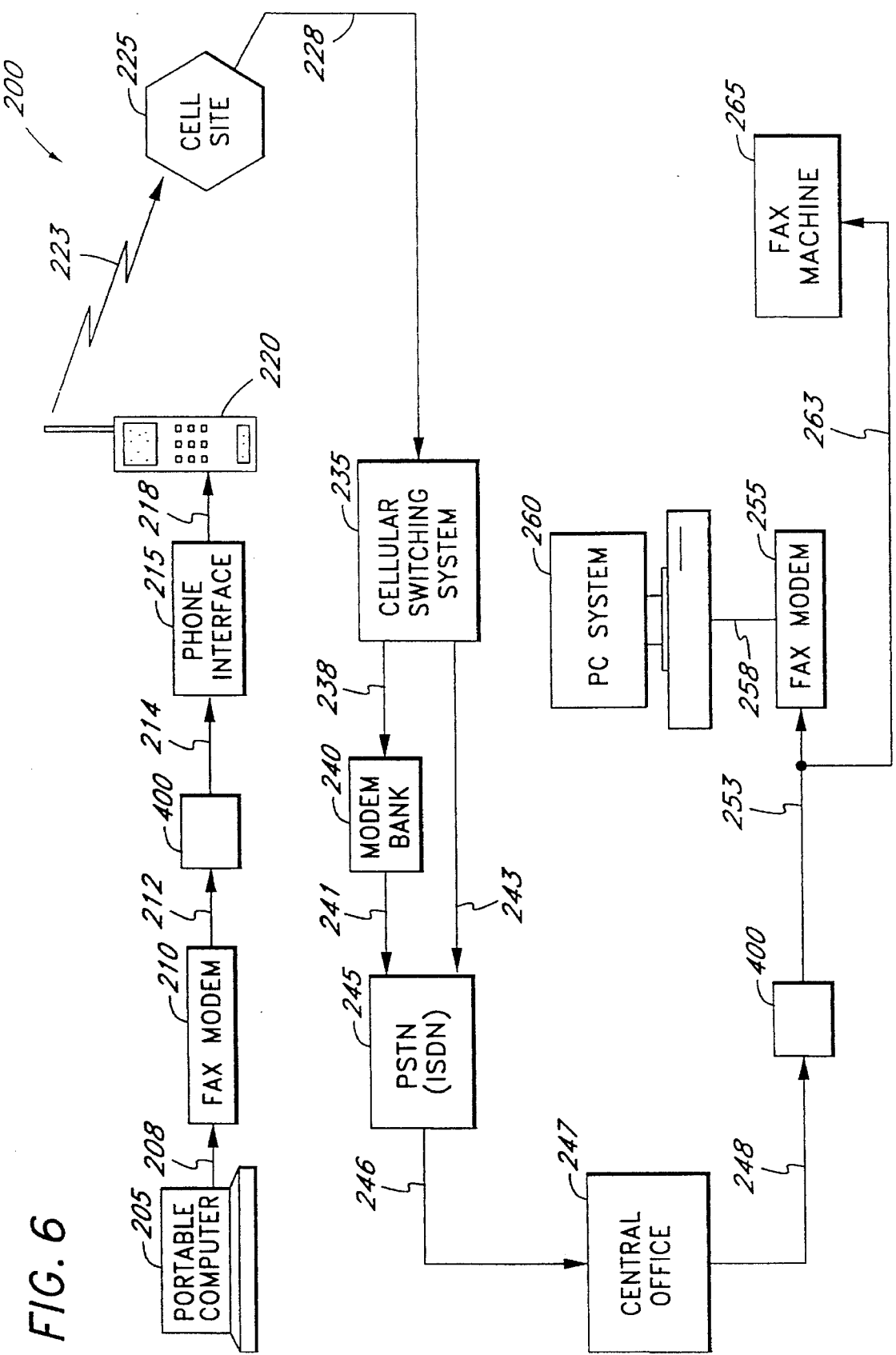
FIG. 6 is a simplified schematic diagram which represents most of the main structural elements of one embodiment of an analog cellular communication system constructed in accordance with the teachings of the present invention.

The Overall Configuration of the De-emphasis/Post-emphasis Circuit Used in One Embodiment of the Invention FIGS. 5A and 5B detail the specific circuitry used in an actual embodiment of a "black box" circuit 400 including both the de-emphasis circuit 320 and the post-emphasis circuit 370. The circuit 400 shown in FIGS. 5A and 5B is advantageously located along the signal path between the FAX modem 210 and the cellular telephone interface 215 as indicated in FIG. 6. Similarly, the complementary circuit on the receiving end (which in the full duplex bi-directional system is the same as the circuit 400 on the transmitting end) is located along the line 248 between the central office 247 and the FAX modem 255, or the facsimile machine 265 (FIG. 6).

Because the circuit 400 is made for bi-directional use, the circuit 400 includes both a de-emphasis circuit portion for outgoing transmission, which will be described first, and a post-emphasis circuit portion for incoming signals, which will be described subsequently.

The circuit shown in FIGS. 5A and 5B includes an input/output jack 402, and an input/output jack 404 which are provided for full duplex bi-directional communication. For purposes of this description, outgoing transmissions (those entering the de-emphasis portion of the circuit 400) will proceed from the jack 402 to the jack 404, while incoming signals (those entering the post-emphasis portion of the circuit 400) will proceed from the jack 404 to the jack 402.

The De-Emphasis Circuit Portion

The input/output jack 402 connects to a coil 410 via an input line 406. The coil 410 is situated within a transformer 408. The transformer 408 may be, for example, a Model NO. TY302P transformer commercially available from MAG-NETEC-TRIAD. Such transformers are commercially available from other sources for use in hybrid telephone circuits. The coil 410 couples electrical energy to a coil 412 and also to a coil 414. As will be explained later, the coil 414 is provided for cancellation purposes in a hybrid circuit for special use in full duplex bidirectional communication.

The coil 412 connects to ground on one end via a line 415. The other end of the coil 412 connects to a potentiometer 418 via a line 416. The potentiometer 418 connects to a resistor 420 which in turn connects to ground. In one embodiment, the potentiometer 418 has a maximum resistance of 500 ohms while the resistor 420 has a resistance of 120 ohms. Four voltage regulation diodes 422 are connected in parallel with the voltage divider formed by the potentiometer 418 and the resistor 420. The voltage regulation diodes 422 may, for example, comprise diodes manufactured by National Semiconductor, and others, Part No. 1 N4004.

The variable arm, or wiper, of the potentiometer 418 further connects to a capacitor 424 which, in one embodiment, is a 1 microfarad capacitor. The capacitor 424 connects in series with a resistor 426 which may, for example, have a resistance of 18,000 ohms. The resistor 426 connects to the inverting (−) input of an operational amplifier 428. In one actual embodiment, the operational amplifier 428 is sold by National Semiconductor, Motorola, Signetics, and others under Part No. UA1458 or MC1458, for example. A resistor 430 in parallel with a capacitor 431 connects on one end to the inverting (−) input of the amplifier 428 and on the other end, to an output 429 of the amplifier 428. In one embodiment, the resistor 430 has a value of 56,000 ohms, and the capacitor 431 has a value of 680 picofarads. The non-inverting (+) input of the amplifier 428 connects to a bias line 432.

The bias line 432 provides a reference voltage source via a voltage divider circuit comprising a resistor 434, a resistor 436 in parallel with a capacitor 437, and a voltage source 438. As shown in FIG. 5A, the voltage source 438 is a 12-volt voltage source in one embodiment. The resistors 434 and 436 connect between the voltage source 438 and ground, while the bias line 432 connects between the resistors 434 and 436. In one embodiment, the resistors 434 and 436 are both 10,000 ohm resistors, while the capacitor 437 is 1 microfarad, so that the voltage provided on the bias line 432 is approximately +6 volts.

The output 429 of the operational amplifier 428 connects to a resistor 440. The resistor 440 may, for example, have a value of 4,700 ohms. The resistor 440 connects in series with an inverting (−) input 442 of an operational amplifier 444. The non-inverting (+) input of the operational amplifier 444 also connects to the bias line 432. A capacitor 446 and a resistor 448 connect in parallel with one end connected to the inverting (−) input 442 of the amplifier 444 and the other end connected to an output 450 of the amplifier 444. Specific values of the capacitor 446 and resistor 448 may be 0.033 microfarads and 82,000 ohms, respectively. Furthermore, the operational amplifier 444 advantageously is supplied by the same manufacturer and is the same part number as the amplifier 428 and is included within the same IC package.

The output 450 of the amplifier 444 connects in series with a capacitor 452. The capacitor 452 may, for example, be a 1 microfarad capacitor. The capacitor 452 connects to a coil 454 via a line 453. The coil 454 is situated within a transformer 455 which is advantageously supplied by the same manufacturer under the same part number as the transformer 408. Voltage regulation diodes 456 connect in parallel across the coil 454. The coil 454 connects to a resistor 458 via a line 457. The resistor 458 in turn connects to ground. The resistor 458 may, in one embodiment, have a value of 620 ohms.

The coil 454 couples electromagnetic energy to a coil 460. The coil 460 connects to the input/output jack 404 via an output line 462. The coil 454 further couples electromagnetic energy to a coil 464 within the transformer 455. Energy coupled to the coil 464 serves to cancel unwanted signals which frequently occur in full duplex bi-directional operation as will be explained further below.

The circuit connected between the input line 406 and the output line 462, as described and depicted in FIG. 5A, comprises one specific embodiment of a de-emphasis circuit which de-emphasizes high frequencies at a rate of 6 dB/octave. That is, this portion of the circuit provides a low-pass filter with a fall-off rate of 6 dB/octave and corresponds to the block 320 in FIG. 4.

The Post Emphasis Circuit Portion

Received data is input into the input/output jack 404 and passes through a postemphasis circuit portion of the circuit 400 as described immediately hereafter. The jack 404 connects to an input line 466 which serves as an input to a coil 468. The coil 468 is situated within a transformer 470 which is advantageously supplied by the same manufacturer under the same part number as the transformers 455 and 408. The coil 468 couples electrical energy to a coil 472 and a coil 473, both within the transformer 470. As with the coils 464 and 414, the coil 473 is provided for cancellation purposes within a hybrid circuit for full duplex bi-directional communications.

One end of the coil 472 connects to ground while the other end of the coil 472 connects to a potentiometer 476 in a filter circuit 477 (shown in FIG. 5B) via a line 474. The potentiometer 476 is a variable resistor which has a maximum resistance of 500 ohms in one embodiment. The potentiometer 476 further connects in series with a resistor 478 which in turn connects to ground. The resistance of the resistor 478 may, for example, be 120 ohms. Four voltage regulation diodes 480 connect in parallel with the voltage divider formed by the resistor 478 and the potentiometer 476. The variable arm, or wiper, of the potentiometer 476 connects to a capacitor 482, which in one embodiment may have a value of 1 microfarad. The capacitor 482 connects in series with a resistor 484 which may, for example, have a value of 18,000 ohms. The resistor 484 connects to an inverting (−) input 485 of an operational amplifier 486. The operational amplifier 486 advantageously is supplied by the same manufacture under the same part number as the operational amplifiers 444 and 428. The non-inverting (+) input of the operational amplifier 486 connects to the bias line 432 connected to non-inverting (+) input of the operational amplifier 444 in FIG. 5A. A resistor 488, having an exemplary value of 56,000 ohms, connects on one end to the inverting (−) input 485 and on the other end, to an output 490 of the operational amplifier 486.

A capacitor 492 and a resistor 494 which have exemplary values of 0.022 microfarads and 30,000 ohms, respectively, are connected in parallel between the output 490 of the amplifier 486 and a resistor 496. The resistor 496 has, in one embodiment, a resistance of 1,000 ohms.

The resistor 496 connects to an inverting (−) input 498 of an operational amplifier 499. The non-inverting (+) input of the operational amplifier 499 connects to the bias line 432. A resistor 502 connects between the inverting (−) input 498 of the operational amplifier 499 and an output 504 of the operational amplifier 499. In one embodiment, the resistor 502 has a resistance of 43,000 ohms. The output 504 of the operational amplifier 499 connects to a capacitor 506 having an exemplary value of 1 microfarad. The capacitor 506 connects to a coil 510 in FIG. 5A via a line 508. The coil 510 is situated within a transformer 512 which is supplied by the same manufacturer under the same part number as the transformers 408, 455 and 470. Four voltage regulation diodes 514 (FIG. 5B) connect in parallel across the terminals of the coil 510 via the line 508 and a line 515. A resistor 516, having an exemplary value of 620 ohms, connects between the line 515 and ground.

The coil 510 couples electrical energy to a coil 518 within the transformer 512 which in turn connects to an output line 520 connected to the input/output jack 402. The coil 510 also couples electrical energy to a coil 522 within the transformer 512 for cancellation purposes.

The circuit connected between the input line 466 and the output line 520 serves as a post-emphasis circuit which amplifies high frequencies at a rate of 6 dB/octave. That is, the circuit between the input line 466 and the output line 520, which corresponds to the post-emphasis circuit 370 shown in FIG. 4, is an active high-pass filter which provides a constant amplification as a function of frequency with a positive slope of 6 dB/octave.

In order to provide a DC path for the hook switch of an externally connected modem, as well as a low frequency path for ring voltage, the coil 410 connects to the coil 460 via a line 524, while the coil 518 connects to the coil 468 via a line 526. Furthermore, a capacitor 528 and a capacitor 530 each having values, for example, of 4.7 microfarads, connect in parallel between the lines 524 and 526.

The Hybrid Circuits

Because the disclosed system operates as a full duplex bi-directional communication system, it is necessary to provide interference cross signal canceling via conventional 2 to 4 wire splitter, or hybrid, circuits 531, 533. The transformers 408 and 512 are included within the hybrid circuit 531, while the transformers 455 and 470 are included within the hybrid circuit 533. In the hybrid circuit 531, the coil 522 connects to the coil 414 via a line 532. Between the opposite terminals of the coils 414 and 522, a capacitor 536 having an exemplary value of 0.015 microfarads and a resistor 534 having an exemplary value of 620 ohms are connected in parallel. In a similar fashion within the hybrid circuit 533, the coil 473 connects to the coil 464 via a line 538. A capacitor 542 having an exemplary value of 0.015 microfarads and a resistor 540 having an exemplary value of 620 ohms are connected in parallel between the other terminals of the coils 464 and 473.

Operation of the De-emphasis Portion of the Circuit 400

In operation, a communication signal input to the input/output jack 402 onto the input line 406 enters the coil 410 and is coupled to the coil 412 so that substantially the same communication signal is present on the line 416. The signal is then voltage divided by the potentiometer 418 and the resistor 420 so that some fraction of the signal on the line 416 is present on the output of the variable arm of the potentiometer 418. Thus, by varying the position of the wiper arm of the potentiometer 418, the overall system gain may be linearly attenuated. The signal passes through the coupling capacitor 424 and the bias resistor 426, and enters a buffer amplifier comprising the amplifier 428, the resistor 430, and the capacitor 431. The buffer amplifier amplifies the input signal.

The output of the buffer amplifier on the line 429 enters into a low pass filter formed by the resistor 440, the amplifier 444, the resistor 448, and the capacitor 446. This low pass filter provides a 6 dB/octave roll-off. As is well understood in the art, the overall gain of the amplifier 444 is set by the ratio of the feedback impedance provided by the resistor 448 and the capacitor 446 to the input resistance provided by the resistor 440. As the frequency increases, the capacitive reactance provided by the capacitor 446 decreases, thereby reducing the ratio of the impedance provided by the capacitor 446 and the resistor 448 to the input resistor 440. The values of the capacitor 446, the resistor 448, and the resistor 440 are chosen specifically so as to provide a gain reduction rate of 6 dB/octave of frequency.

The output of the low pass filter on the line 450 is coupled through the coupling capacitor 452 and enters the coil 454. The signal present on the coil 454 is coupled to the coil 460 and thereby transferred to the output line 462 to be received at the input/output jack 404.

The diodes 422 are connected in parallel across the input of the de-emphasis portion of the circuit in order to provide voltage regulation and thereby protect the circuit input from sudden voltage spikes, etc. Similarly, the diodes 456 which are connected in parallel with the coil 454 also serve as voltage regulators to protect the coil 454 from sudden voltage spikes, etc. The resistor 458 provides a resistance which provides a 620 ohm load to the hybrid circuit 533.

Operation of the Post-emphasis Portion of the Circuit 400

Signals input to the jack 404 onto the input line 466 are post-emphasized and output to the jack 402 on the output line 520. A signal input on the line 466 is coupled to the line 474 through the mediation of the transformer coils 468 and 472. The signal on the line 474 is voltage divided across the resistor 478 and the potentiometer 476. Thus, the signal output on the variable arm of the potentiometer 476 is a linearly scaled version of the signal on the line 474. The ratio between the signal on the variable arm of the potentiometer 476 may be varied by varying the position of the wiper arm of the potentiometer 476. Thus, the voltage divider formed by the resistor 478 and the potentiometer 476 is able to alter the overall gain of the post-emphasis circuit.

The signal on the variable arm of the potentiometer 476 is coupled through the coupling capacitor 482 to the bias resistor 484. The signal then passes through the bias resistor 484 to the input of a buffer amplifier formed by the amplifier 486 and the resistor 488. As with the buffer amplifier formed by the amplifier 428 and the resistor 430, the purpose of the buffer amplifier formed by the amplifier 486 and the resistor 488 is to amplify the input signal.

Furthermore, the buffer amplifier formed by the resistor 488 and the amplifier 486 provides a uniform impedance for the hybrid circuit 531. This is because the gimpedance of the input circuit to the next amplifier stage (i.e., the amplifier 499) is frequency dependant due to the parallel capacitor 492. At very high frequencies, the impedance of the input circuit of the amplifier 499 is approximately 1,000 ohms, while at very low frequencies, the input impedance is approximately 31,000 ohms. By placing the buffer amplifier formed by the resistor 488 and the amplifier 486 between the hybrid circuit 531 and the input circuit to the amplifier 499, a more uniform impedance is seen by the hybrid circuit 531.

The output signal from the buffer amplifier on the line 490 enters a high pass filter formed by the capacitor 492, the resistor 494, the resistor 496, the resistor 502 and the amplifier 499. The gain of the amplifier 499 is set by the ratio of the value of the resistor 502 to the input impedance provided by the value of the resistor 496 in combination with the impedance produced by the parallel connection of the capacitor 492 and the resistor 494. As the input frequency is increased, the capacitive reactance of the capacitor 492 decreases. Therefore, the overall ratio of the resistor 502 to the input impedance provided by the resistor 496, the capacitor 492, and the resistor 494 increases with the frequency with an absolute limit of 43 to 1 (i.e., the ratio of the value of the resistor 502 to the value of the resistor 496). The values of the resistor 496, the resistor 502, the resistor 494, and the capacitor 492 are selected to provide a gain increase rate of 6 dB/octave of frequency.

The output of the high pass filter on the line 504 is coupled through the coupling capacitor 506 to the line 508. The signal on the line 508 is fed to the output line 520 and subsequently to the jack 402 through the mediation of the transformer coils 510 and 518.

Operation of the Hybrid Circuits

As stated above, the transformers 408 and 512, the capacitor 536, and the resistor 534, as well as the transformers 455 and 470, the resistor 540, and the capacitor 542, comprise the hybrid cancellation circuits 531, 533 which allow for simultaneous bi-directional communication through the circuit 400. In the hybrid circuit 531, a communication signal present in the coil 518 will also couple to the coil 410 via the capacitor 528, as well as through the modem which is externally connected to the jack 402. Thus, the signal on the coil 410 is a composite of both the desired signal input on the input line 406, and the interference signal on the output line 520. In order to prevent the interference component of the signal from being coupled to the coil 412, the hybrid circuit 531 is provided.

As noted above, the signals present on the coil 518 are coupled to the coil 522. This signal on the coil 522 is then coupled to the coil 414 via the capacitor 536 and the resistor 534 so that the signal present on the coil 414 is 180° out of phase with the signal present on the coil 522. Thus, the signal present on the output line 520 is present both in the coil 410, as well as in the coil 414, so that the signal on the coil 414 is 180° out of phase with the signal on the coil 410.

The inverted signal present on the coil 414 interacts with the signal present on the coil 410 to cancel that component of the signal present on the coil 410 which is caused by the signal on the output line 520. The values of the capacitor 536, the resistor 534 and the capacitor 528, as well as the number of turns in the winding of the coil 522, are chosen to insure that the amplitude of the signals present on the coil 410 and the coil 414 are equal and opposite so that the interfering component of the signal present on the coil 410 is substantially canceled by the signal present on the coil 414. As is well understood in the art, the values of the capacitor 536 and the resistor 534 are typically chosen to balance the impedance of an externally connected modem connected to the jack 402. Because the interference signal present on the coil 410 is substantially canceled, the signals input to the coil 510 are coupled via the coil 518 to the output line 520, but are not coupled to the coil 412 due to the cancellation provided by the coil 414.

In a similar fashion, within the hybrid circuit 533, signals present on the coil 454 are coupled to the output line 462 via the coil 460. The signal present on the output line 462 is also coupled to the coil 468 via the capacitor 530 and via a telephone line connected to the jack 404. Therefore, in addition to the desired input signal provided to the coil 468 via the input line 466, an undesired interference signal is also coupled to the coil 468. However, in a manner similar to that described immediately above, signals present on the coil 473 serve to cancel any interference component of the signal present on the coil 468, so that only the desired input signal is coupled to the coil 472 and thereby passed through the post-emphasis portion of the circuit 400.

The Modem Internal Compensation Circuit

Figure 7:
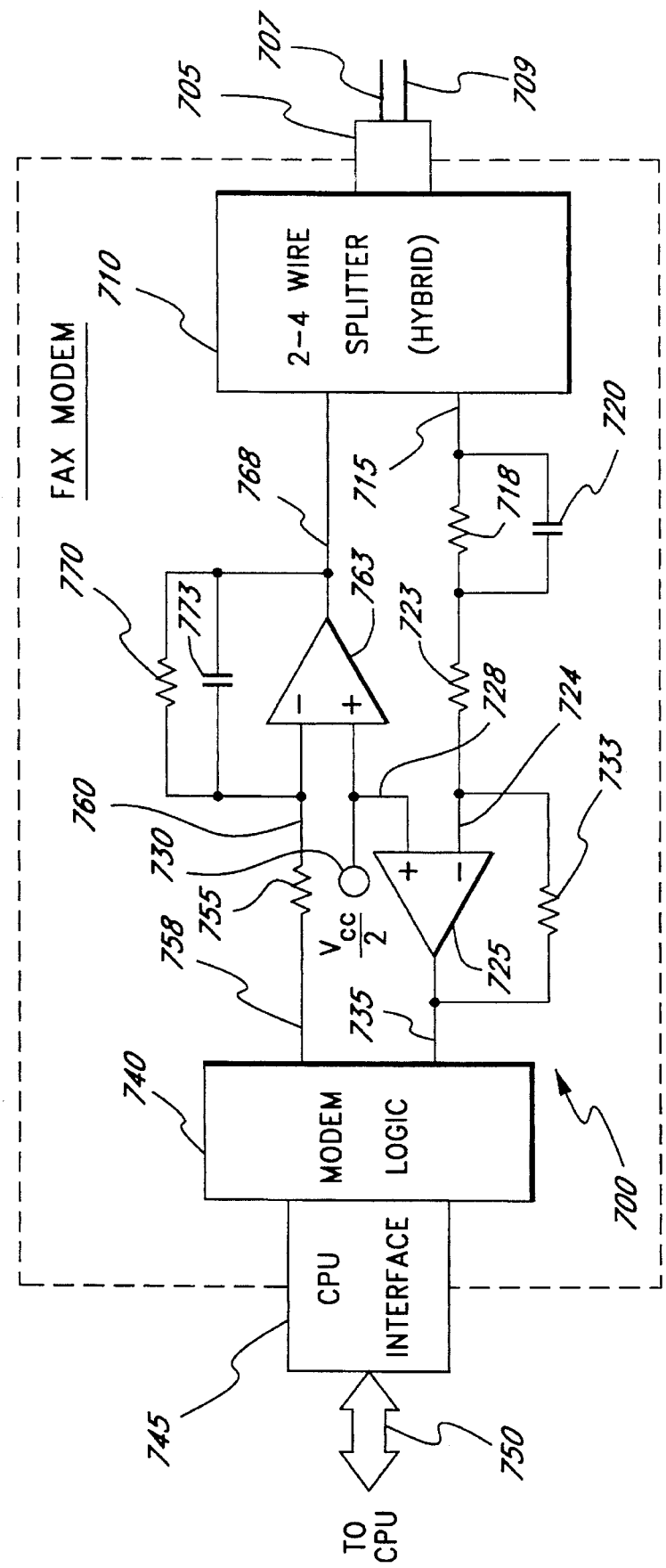
FIG. 7 is a schematic diagram which shows the internal circuitry of a modem as altered in accordance with one embodiment of the present invention.

FIG. 7 is a schematic diagram of a de-emphasis/post-emphasis circuit 700 as implemented internally within the FAX modem 210 and, complementarily, within the FAX modem 255. The circuit 700 is a somewhat simplified version of the circuit 400, and performs essentially the same functions of post-emphasizing incoming signals and de-emphasizing outgoing signals.

Data signals are input to the circuit 700 via a jack 705 having input/output lines 707, 709. The jack 705 connects to a 2–4 wire splitter, or hybrid circuit 710 (designated generally as a box in FIG. 7). The hybrid circuit 710, like the hybrid circuits 531 and 533 is well known in the art, and all description relating to the connection and operation of the hybrid circuits 531,533 apply equally to the hybrid circuit 710. The hybrid circuit 710 connects to the input of the post-emphasis portion of the circuit 700 via a line 715, which connects to a resistor 718 in parallel with a capacitor 720. The resistor 718 and the capacitor 720 connect to a resistor 723, which in turn connects to an inverting (−) input 724 of an operational amplifier 725. A non-inverting (+) input 728 of the amplifier 725 connects to a voltage source 730 which provides a bias voltage.

A resistor 733 connects between the inverting input 724 of the amplifier 725 to an output 735 of the amplifier 725. The output 735 of the amplifier 725 connects to conventional modem logic (designated generally by a box 740 in FIG. 7). The modem logic 740 connects to a CPU interface 745, which in turn connects to a CPU bus 750. The modem logic 740, the CPU interface 745, and the CPU bus 750 are all standard and are already provided within the FAX modems 210, 255.

The modem logic 740 connects to the input of the de-emphasizing portion of the circuit 700 via a line 758 which connects to a resistor 755. The resistor 755 connects to an inverting (−) input 760 of an operational amplifier 763. The operational amplifier is advantageously included within the same IC package as the amplifier 725. A non-inverting (+) input 765 of the amplifier 763 connects to the voltage source 730.

A resistor 770 and a capacitor 773 connect in parallel across the inverting input 760 of the amplifier 763 and an output 768 of the amplifier 763. The output 768 of the amplifier 763 connects to the hybrid circuit 710, and, through it, to the jack 705.

The particular values of the elements of the circuit 700 may vary from modem to modem, as will be appreciated by one of ordinary skill in the art. It should be noted that, other than the capacitors 720, 773, the circuit 700 as shown in FIG. 7 is already provided within a conventional FAX modem. In order to implement this embodiment of the present invention, therefore, one need simply add the capacitors 720, 773, and change the resistance values of some of the resistive elements (e.g., the resistors 733, 718, and 770).

In operation, an input data signal is split through the hybrid circuit 710 and is provided as an input to the post-emphasis portion of the circuit 700. Due to the connection of the capacitor 720 at the input 724 of the amplifier 725, the gain of the amplifier stage varies directly with frequency. In a preferred embodiment, the values of the resistor 718, the resistor 733, and the capacitor 720 are chosen to provide a 6 dB/octave gain.

Data signals going out of the FAX modem are provided as inputs to the de-emphasis portion of the circuit 700 from the modem logic 740. Due to the capacitor 773 the gain of the amplifier stage 763 varies inversely as a function of frequency. In a preferred embodiment, the values of the resistor 755, the resistor 770, and the capacitor 773 are chosen to provide a 6 dB/octave roll-off.

Thus, a de-emphasis/post-emphasis circuit implemented internally within a FAX modem on both the transmitting and receiving ends provides the same offsetting effects as the externally implemented circuit 400. By this means, the amplitude distortion introduced by the limiter circuit 150 is reduced significantly, as discussed above with reference to FIGS. 4, and 5A and 5B.

In a further embodiment (not shown) of the invention, substantially the same de-emphasis/post-emphasis compensation circuitry 700 can be advantageously implemented within the telephone interface 215 (FIG. 7), which has a 4-wire interface with the cellular telephone 220 and a 2-wire interface with the Fax modem 210.

The Pilot Signal System

Another system and method which can advantageously be used to keep the gain of the limiter 150 constant involves the introduction of a constant frequency, constant amplitude pilot tone signal at the high frequency end of the transmitted data signal. Because the pilot signal initially has a higher amplitude than the data signals to be transmitted and has a frequency greater than the highest frequency within a data transmission, a pre-emphasizer will amplify it the most so that it is always the highest amplitude signal detected by the limiter 150. Thus, the limiter 150 always adjusts its gain by the amplitude of the pilot signal (which is constant throughout). Therefore, the gain of the limiter is always kept constant. At the receiving end, the pilot signal is easily filtered out of the data signal using a high Q notch filter since the pilot signal always maintains a constant frequency and is at the edge of the transmitted frequency range. The use of a notch filter is especially advantageous in preventing phase distortion often associated with low-pass filters. A more detailed description of the pilot signal embodiment of the invention is provided with reference to FIG. 8.

Figure 8:
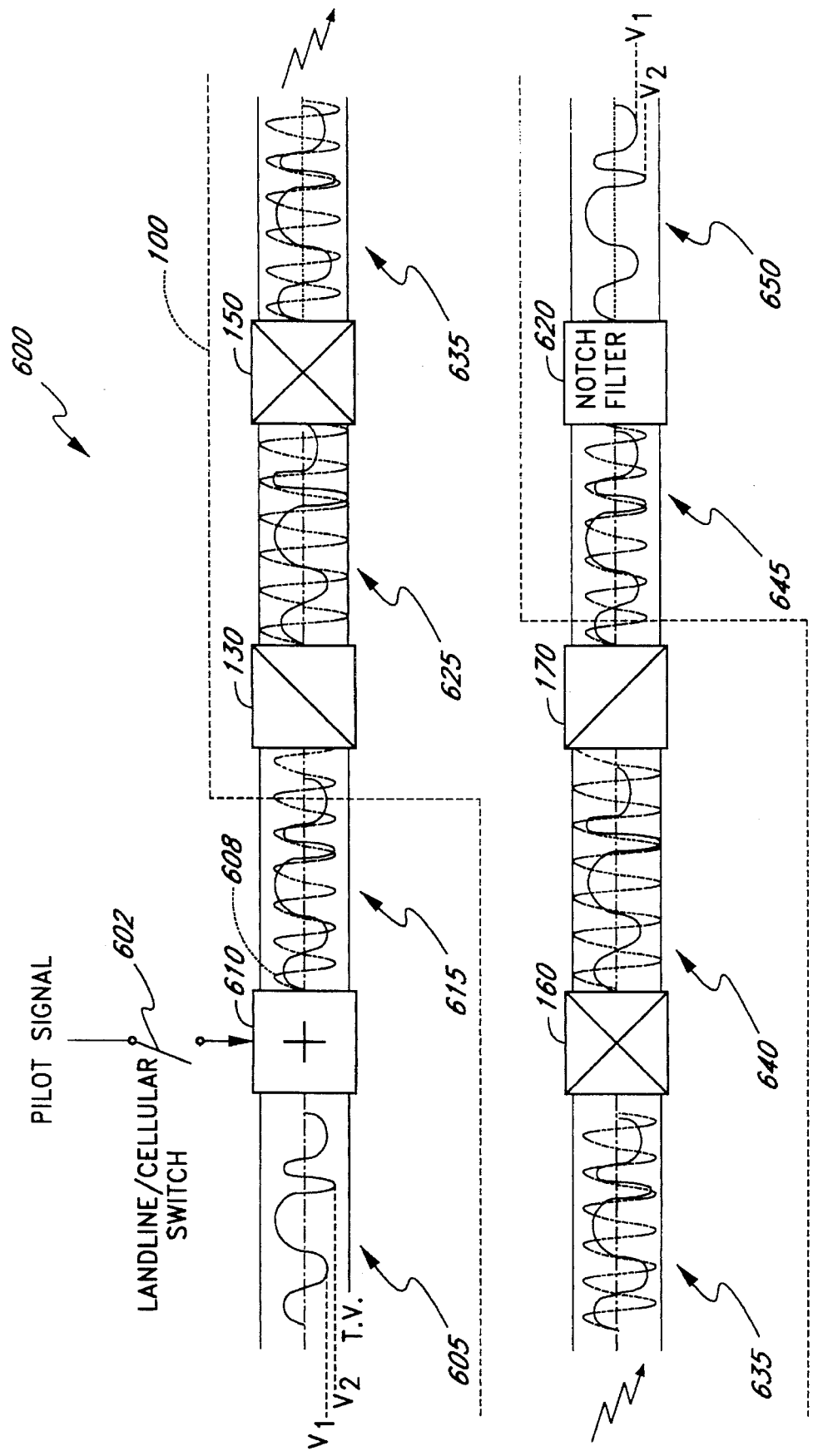
FIG. 8 is a system block diagram schematically showing the waveforms and functional system blocks associated with a pilot signal embodiment of the present invention.

FIG. 8 is a system block diagram schematically showing the waveforms into and out of each main functional block of a cellular transmission system 600. The system 600 is one embodiment of an improved analog cellular transmission system constructed in accordance with the teachings of the present invention. The system 600 uses a pilot signal to keep the gain of the limiter 150 constant throughout transmission when enabled by a switch 602, for example, when data is transmitted. As is the case with the system 300, the system 600 is advantageously implemented with the already existing conventional transmit/receive system 100 (including the pre-emphasis circuit 130, the limiter 150, the expander 160, and the de-emphasis circuit 170). Thus, the system 600 may be retroactively implemented with most existing analog cellular communication systems.

The system 600 includes a pilot signal combiner circuit 610 on the transmitter side, and a notch filter 620 on the receiver side. The pre-emphasis circuit 130, the limiter 150, the expander circuit 160, and the de-emphasis circuit 170 are interposed between the combiner circuit 610 and the notch filter 620. A data signal 605 encoded by means of both amplitude and phase modulation techniques (or by other combinations as discussed above) enters the pilot signal combiner circuit 610 which combines a generated pilot signal 608 with the data signal 605 to form a composite output signal 615. It should be understood that, although the pilot signal component 608 of the composite signals is shown as a separate signal in FIG. 8, in actuality the signals combine to form one composite signal. For ease of conceptualization, and for purposes of the following description, however, it is advantageous to represent both the data and pilot signal components of each of the composite signals separately. The characteristics of the generated pilot signal 608 are such that the amplitude of the pilot signal is always greater than or equal to the maximum amplitude of the incoming data signal 605, and the frequency of the pilot signal 608 is always greater than the maximum frequency of the data signal 605. In one preferred embodiment, the frequency of the pilot signal 608 is approximately 3.4 kHz (i.e., just above the maximum frequency which the data signal 605 would normally attain).

The signal 615 enters the pre-emphasis circuit 130 wherein the higher frequency components of the waveform 615 are amplified at a gain of 6 dB/octave. Because the pilot signal 608 was initially chosen to have a frequency which is greater than the frequency of the data signal, the pilot signal component of the waveform 615 will be amplified the most, while the high frequency components of the waveform 615 due to the data signal are amplified somewhat less, as depicted in the waveform 625 output from the pre-emphasis circuit 130.

Because the amplitude of the pilot signal 608 before entering the pre-emphasis circuit 130 is always greater than or equal to the amplitude of the data signal 605, and the pilot signal component of the waveform 615 is amplified the most in the pre-emphasis circuit 130, it follows that the pilot signal component of the waveform 625 will always have an amplitude which is greater than or equal to the amplitude of any data components of the signal 625.

The signal 625 enters the limiter 150 which has a gain setting that is dependent upon the maximum voltage amplitude of the input signal 625. Since the pilot signal component of the signal 625 always has the greatest amplitude, the gain of the limiter 150 is always set by the amplitude of the pilot signal component. Thus, by amplifying the pilot signal component is set such that the other data components of the signal 625 are compressed by a constant compression factor as shown in a signal 635 output from the limiter 150.

It is an important aspect of this embodiment of the invention that the amplitude of the pilot signal component of the signal 625 is kept constant throughout transmission. This is because the gain of the limiter 150 must be kept constant to prevent data signal amplitude distortion, and the limiter gain depends upon, and varies directly with, the amplitude of the pilot signal component of the signal 625. In accordance with the present invention, the amplitude of the pilot signal component of the signal 625 always remains constant since the original pilot signal 608 has a constant input voltage and a constant frequency. The constant frequency of the pilot signal 608 insures that the pilot signal component of the signal 615 is always amplified by the same gain in the pre-emphasis circuit 130. Thus, a constant input voltage increased by a constant gain results in a constant output voltage so that the pilot signal component of the signal 625 is kept constant. As a result, the gain of the limiter is fixed throughout data transmission. This is particularly advantageous for purposes of eliminating amplitude distortion caused by the limiter 150 and exacerbated by the prolonged recovery time of the limiter 150, since a constant gain setting requires no recovery.

The signal 635 is modulated onto a carrier, as is well known in the art, and is transmitted to the receiver end of the cellular communication system 600. At the receiver end, the signal 635 enters the expander circuit 160 which expands the dynamic range of the signal 635 back to normal. Thus, assuming accurate detection from the carrier, a signal 640 output from the expander 160 has substantially the same amplitude characteristics as the signal 625 input to the limiter 150.

The signal 640 enters the de-emphasis circuit 170, which de-emphasizes the high frequency components of the signal 640 so that the proportion between the data component of the signal 640 and the pilot signal component of the signal 640 is the same as that exhibited in the signal 615 (before pre-emphasis). The output of the de-emphasis circuit 170 is represented by a signal 645.

The signal 645 enters the notch filter 620. The characteristics of the notch filter 620 are determined so that the high frequency pilot signal component of the signal 645 is completely or nearly removed. Thus, it is advantageous for the notch filter to have a very sharp roll-off just below the frequency of the pilot signal component. In one embodiment, the gain of the notch filter 620 at the pilot signal frequency is approximately $-40$ dB, and no higher than $-25$ dB, while the gain in the frequency band which includes the data signal component is approximately 0 dB, and no less than $-6$ dB. Therefore, the output of the notch filter 620 is merely the data component of the signal 640, as shown by signal 650. Because clipping in the limiter 150 is avoided, and the recovery time of the limiter 150 does not introduce distortion, the output signal 650 has substantially the same amplitude characteristics as the input data signal 605. Thus, the pilot signal embodiment of the present invention allows accurate amplitude discrimination when used in conjunction with an analog cellular communication system.

The pilot tone may be introduced at several locations within the conventional analog cellular communication system 200 depicted in FIG. 2. For example, the pilot tone may be introduced within the FAX modem 210, the telephone interface 215, or along the line 212, between the FAX modem 210 and the telephone interface 215. Likewise, the notch filter 620 may be implemented along the line 253, or within the FAX modem 255, for example.

Alternative Description of Cellular Transmitter

The foregoing description of the operation of the present invention assumes a particular operation of the cellular phone network itself based upon the analysis of the signals communicated to and from a cellular phone. The present invention is not limited to operation in a cellular system or other radio communication in accordance with the foregoing description. For example, the Electronics Industries Association (EIA) Interim Standard, *Recommended Minimum Standards for 800-MHZ Cellular Subscriber Units*, EIA/IS-19-B, May 1988, suggests a different functional relationship between the components in a cellular communications system. A block diagram of the components of a cellular communication system in accordance with that relationship is represented in FIG. 9.

Figure 9:
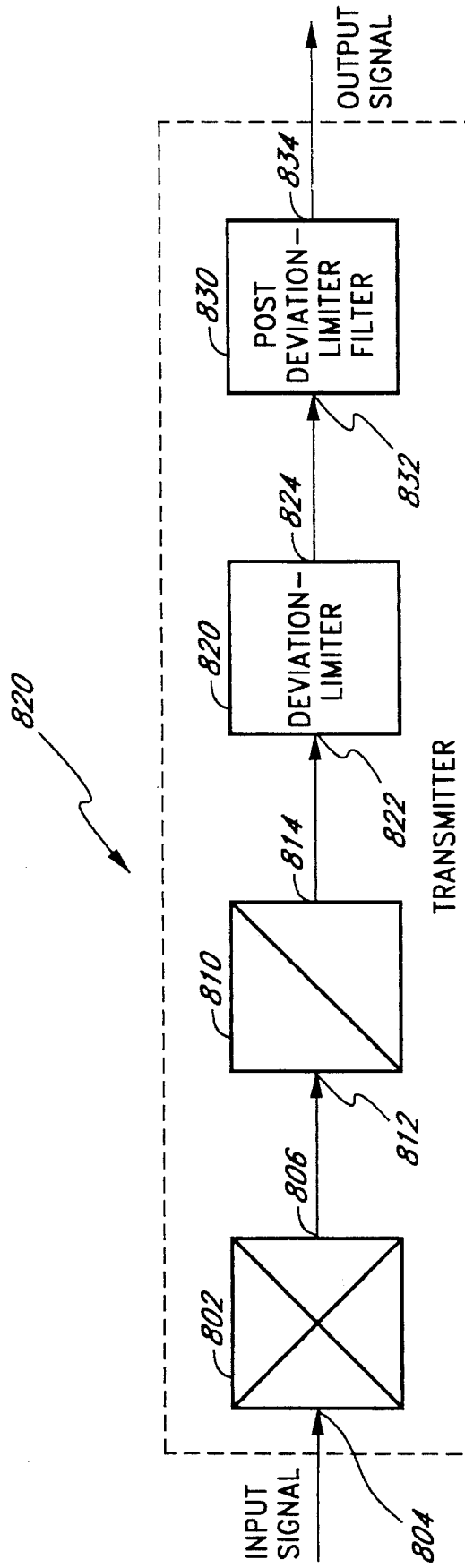
FIG. 9 illustrates an alternative representation of a cellular transmitter in accordance with the IS-19 specification with which the present invention operates to reduce distortion caused by pre-emphasis and limiting.

As illustrated in FIG. 9, a cellular transmitter 800 in accordance with the IS-19 specification comprises a compression circuit 802, which advantageously may be a 2:1 syllabic compressor. The compression circuit 802 has an input which receives an input signal (e.g., voice or data). The compression circuit 802 compresses the amplitude of the signal such that the amplitudes of larger amplitude signals are attenuated by a greater percentage than the amplitudes of lower amplitude signals. The compression circuit 802 has an output 806 which provides a compressed output signal.

A pre-emphasis circuit 810 has an input 812 which receives the compressed output signal from the compression circuit 802. The pre-emphasis circuit 810 operates as discussed above to emphasize (i.e., amplify) the higher frequency signals by a greater amount than lower frequency signals so that the pre-emphasis circuit 810 provides an emphasized output signal at an output 814.

A deviation-limiter circuit 820 has an input 822 which receives the emphasized output signal from the pre-emphasis circuit 810. The deviation-limiter circuit 820 operates on the emphasized output signal to attenuate (i.e., clip) any signals that are greater than a predetermined maximum signal amplitude. This has the effect of distorting any signal having amplitude components greater than this predetermined maximum signal amplitude. The deviation-limiter circuit 820 provides a limited output signal on an output 824.

A post deviation-limiter filter circuit 830 has an input 832 that receives the limited output signal from the deviation-limiter circuit 820 and filters the limited output signal to provide a filtered output signal on an output 834. The effect of the filtering is to suppress any high frequency components generated by the clipping in the deviation-limiter circuit 820. The filtered output signal modulates the cellular phone transmitter (not shown).

As discussed above, the operation of the pre-emphasis circuit 810 to increase the amplitudes of the high frequency signals causes data signals which comprise significant amplitudes in the higher frequencies to be amplified to an extent that the signals are clipped (i.e., limited) by the deviation-limiter circuit 820. This limiting and the resulting distortion prevents the receiving circuit (not shown) from accurately reproducing the input signal.

The present invention operates in cooperation with the cellular phone transmitter system represented in FIG. 9 to prevent or substantially reduce the distortion. As discussed above, the distortion caused by the deviation-limiter circuit 820 can be prevented by bypassing the limiter 820 in the manner described above in FIG. 3. Alternatively, if access to the limiter 820 is not available, a de-emphasis circuit 320 can be included at the input to the transmitter 800 as illustrated in FIG. 4, and a post-emphasis circuit 370 can be included at the output of the receiver (not shown) as was also illustrated in FIG. 4.

It can be seen that regardless of whether the operation of the transmitter in a cellular network is considered in accordance with the representation of FIG. 1 or the representation of FIG. 9, the present invention operates to prevent or reduce the distortion caused by pre-emphasis and limiting within the transmitter so that higher data rates can be communicated over the cellular network.

Compensation of Land Line Effects by Transmitter-end Spectral Shaping

FIGS. 10–15 illustrate an additional embodiment of the present invention. The above-described embodiments of the present invention work well for a portable modem connected to a mobile cellular transmitter or other radio transmitter where the characteristics of the transmitter are well-known. For example, referring to FIG. 6, the present invention 400 inserted between the fax modem 210 and the phone interface 215 provides substantial improvement over systems that do not include the present invention. Similarly, the present invention 400 inserted between the central office 247 and the fax modem 255 also provide substantial improvement at the land line end (i.e., at the end wherein the communications between the fax modem 255 and the central office 247 is via conventional telephone wires). However, it has been found that the transmission characteristics of a typical land line connection are not as well-defined as those of a cellular connection and will vary from call to call in accordance with which particular set of lines and amplifiers are selected within the central office, for example. Thus, although the imposition of a −6 per octave roll-off in the deemphasis circuit 320 will provide substantial improvement on the land line side of the connection between two modems, the inventor has discovered that the roll-off in the deemphasis circuit should be matched to the particular characteristics of the telephone line to which the modem is connected. Because these characteristics vary from connection to connection, the roll-off characteristics cannot be preset. Thus, the embodiment of the present invention described in FIGS. 10–15 provides a means for matching the high frequency roll-off characteristics to each land line connection as it is made.

Figure 10:
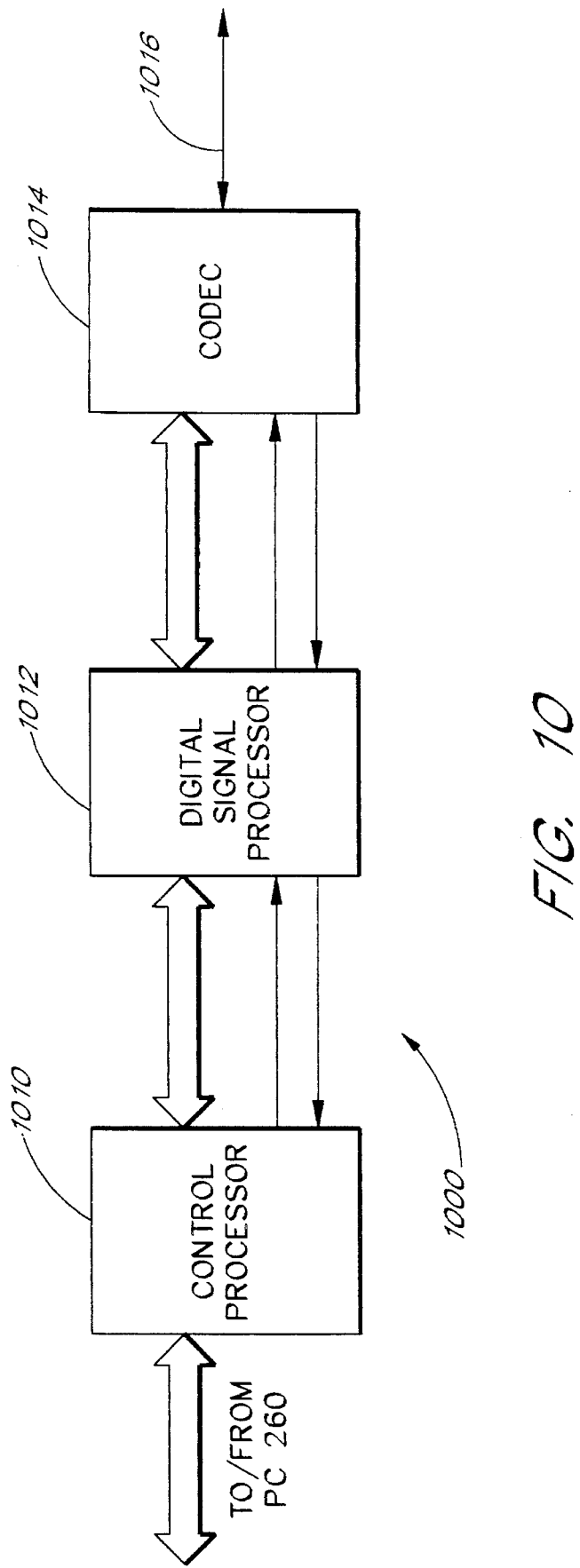
FIG. 10 illustrates a block diagram of an exemplary fax modem showing a control processor, a digital signal processor and an optional CODEC.
Figure 11:
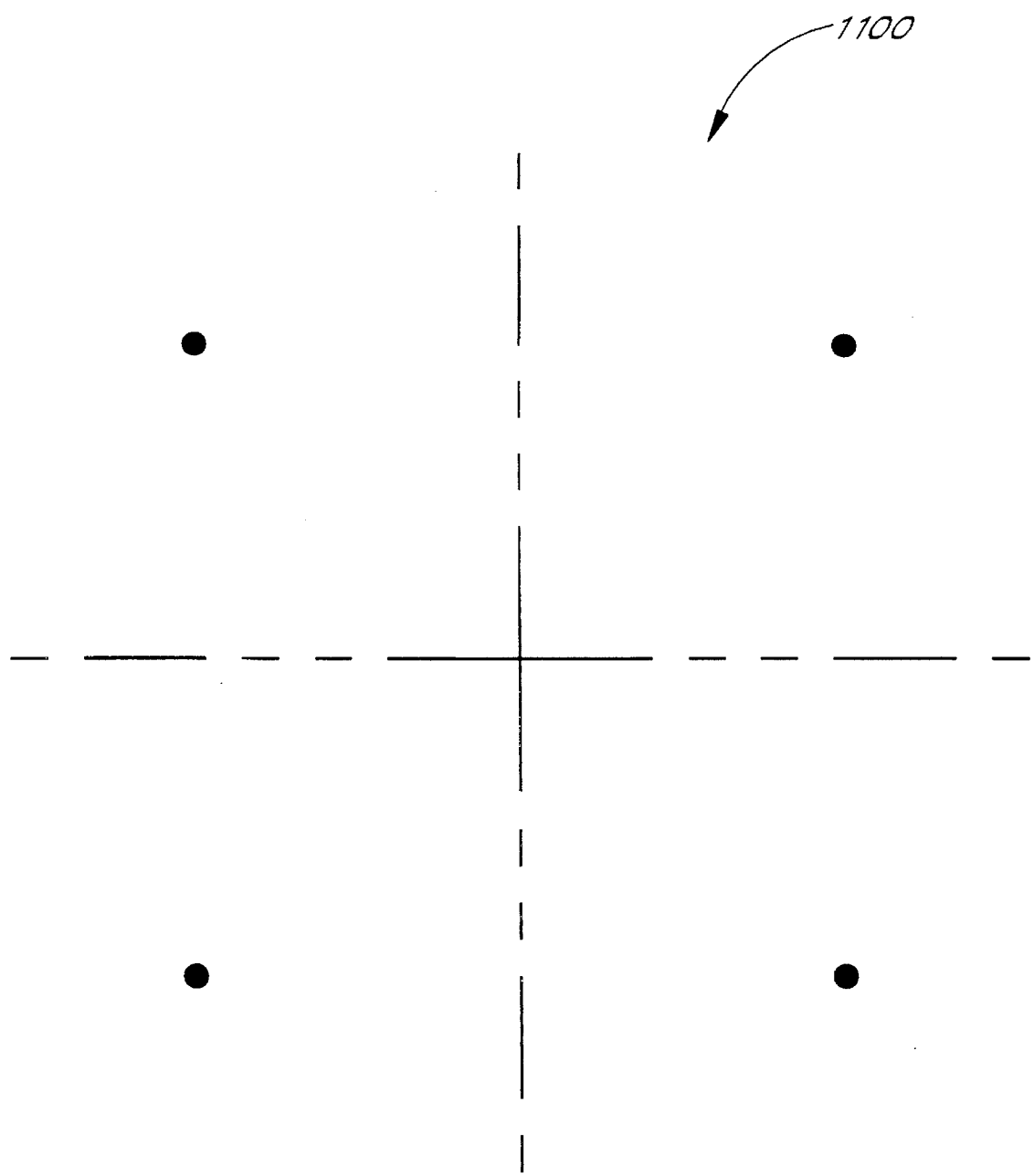
FIG. 11 illustrates an exemplary signal constellation of a 4800 bits per second modem.

The embodiment of FIGS. 10–15 is based upon further investigation of the fax modems. The inventor has learned that most conventional fax modems are constructed as illustrated in FIG. 10. In particular, an exemplary fax modem 1000 includes a control processor 1010 and a digital signal processor 1012. The control processor 1010 is connected to provide commands and data to the digital signal processor 1012 and to receive status and data from the digital signal processor (DSP) 1012. The control processor 1010 thus operates as the interface to the PC system 260 (FIGS. 2 and 6). The fax modem 1000 may also include a CODEC (coder/decoder) 1014. In many modems, the coder/decoder function is built into the digital signal processor 1012 and is not considered as a separate element; however, for ease of describing the operation of the modem 1000, the CODEC 1014 will be described as a separate element. In operation, the CODEC 1014 receives digital signals from the digital signal processor 1012 and converts the digital signals to analog signals for transmission on a telephone line 1016. Similarly, the CODEC 1014 receives analog signals on the telephone line 1016 and converts them to digital signals to be processed by the digital signal processor 1012.

The operation of the digital signal processor 1012 will not be described in detail herein. Basically, the digital processor 1012 converts digital signals received from the control processor 1010 into signals having an amplitude and a phase angle that represents the digital data. For example, when operating at 4800 bits per second, the digital signal processor 1012 converts two bits of data at a time into one of four amplitude and phase angle combinations or points, as illustrated, for example, by a signal constellation 1100 in FIG. 11. Each combination of bit pairs (e.g., 00, 01, 10 and 11) is represented by a different phase angle on the constellation. It will be understood by one skilled in the art that the phase angles are not absolute phase angles for each bit pair, but that the current bit pair is determined by the phase angle change from the last bit pair. Furthermore, in order to avoid repetitive patterns, the digital signal processor 1012 encodes the data received from the control processor 1010 so that a continuous stream of identical data (e.g., a stream of all zeros) will cause the transmitted data to vary and thus cause the same data to be represented by different phase angle changes. This technique is commonly called data scrambling. When the data rates increase, for example, to 9600 bits per second, the number of phase angles in the constellation increases, and, in addition, the amplitudes of the signals vary to represent different bit combinations. In particular, a modem operating at 9600 bits per second in accordance with the V.32/9600 standard operates with a constellation having 32 phase and amplitude points, with each point representing four data bits. Modems operating at higher data rates have more phase and amplitude points to represent the data.

When receiving data, the digital signal processor 1012 determines which of the points most closely matches the received signal, and generates digital data in accordance with the determined point (two bits of data when operating at 4800 bits per second, four bits of data when operating at 9600 bits per second). The locations of points in the constellation can be significantly affected by line conditions which vary with the phase changes of the transmitted signals. As is well understood in the art, large phase changes cause steep transitions to appear in the modulated signal. These steep transitions correspond to high frequency components in the modulated signal. Thus, if the line over which a signal is transmitted has frequency dependent attenuation characteristics, the amplitude of an encoded data bit signal can vary as a function of the phase transition which is used to encode the bit. For example, if a particular bit pattern causes a large phase change in the transmitted signal, the amplitude of the transmitted signal may be disproportionately reduced in comparison with a signal encoded by a smaller phase change. Thus, the received signal may not be measured at the correct point in the constellation and may thus be misinterpreted as a different bit pattern than the bit pattern that was originally transmitted.

Because of varying line conditions and modem capabilities, a pair of modems (e.g., the modem 210 and the modem 255 in FIGS. 2 and 6) may not always be able to communicate with each other at the highest data rate of a particular modem. When the modems are first connected, the two modems monitor the resolution available within the signal constellation at each of the available data rates, beginning with the lowest data rate. The data transmission rate which is selected is the maximum rate at which both modems can accurately discriminate each of the points on the signal constellation.

The accuracy with which a modem can discriminate each of the points on the constellation is a function of "eye quality." Generally speaking, eye quality is a measure of the deviation of the points on the constellation corresponding to the actual data bits from the ideal point on the constellation for that data bit. For example, suppose that an ideal point on a signal constellation for the data di-bit 01 is 45° at an amplitude of 5 units. A received signal which includes data points for the di-bit 01 equally distributed over a range of 40°–50° and 4–6 units will have a greater eye quality than a signal which includes data points for the di-bit 01 equally distributed over a range of 35°–55° and 3.5–6.5 units. The eye quality of a signal constellation typically varies with line conditions since these conditions introduce both amplitude and phase variations into the transmitted data signal. For example, two modems capable of operating at 9600 bits per second may operate at only 4800 bits per second under adverse line conditions.

Once the initial data rate is selected, each modem monitors the eye quality of its received signal. If the eye quality of the received signal becomes so bad that accurate discrimination of the points on the signal constellation is no longer possible, then the modem which is having eye quality problems signals the other modem that the data rate should be stepped down. Likewise, if the eye quality improves substantially, the two modems may agree to step up the data rate. The respective operations of each of the two modems in determining a transmission data rate with the other modem are controlled in each modem by the respective control processor 1010 which sends commands to the digital signal processor 1012 of the other modem to cause it to execute at a particular data rate. The control of the digital signal processor 1012 by the control processor 1010 in each modem is well known to persons skilled in the art, and will not be described further herein.

The embodiment of FIGS. 10–15 of the present invention exploits the self-testing capabilities and control capabilities of the modems by adding features to the control processor 1010 to cause the digital signal processor 1012 to transmit predetermined signals to the telephone line and to respond to the signals returned from the telephone line.

Figure 12:
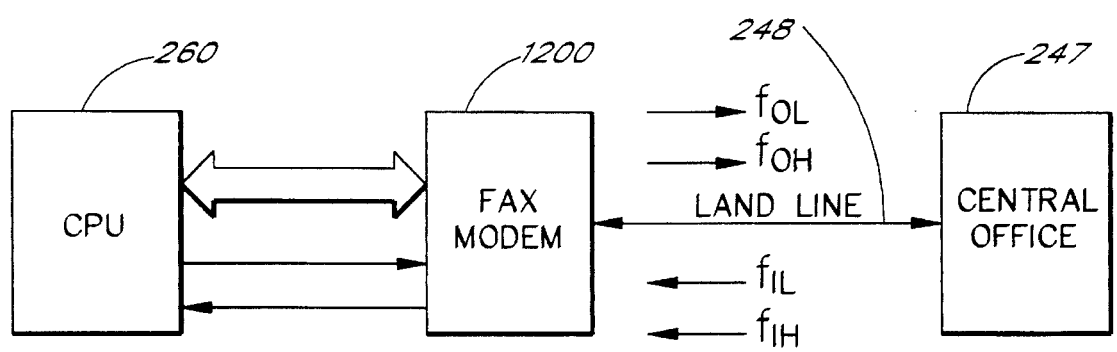
FIG. 12 illustrates a block diagram of a connection between a fax modem in accordance with the present invention and a telephone central office, showing the transmission of signals at two frequencies to the central office and the receipt of echoes from the central office.

Under one aspect of the present invention, described with reference to the block diagram of FIG. 12, the spectral characteristics of a transmitting FAX modem 1200 are determined at the beginning of each connection in accordance with the characteristics of a land line connection 248 between the transmitting modem 1200 and the central office 247. Two separate embodiments may be used to set the spectral shaping characteristics of the modem 1200 so as to compensate for losses incurred over the land line 248.

In a first embodiment, described with reference to the flowchart of FIG. 13, data signals are transmitted to the central office 247 over the land line 248. As is well understood in the art, these signals produce echo pulses, or pings, which echo off the central office connection and return to the modem 1200. These pings can be measured for signals having various frequencies to determine the frequency attenuation due to the land line 248. The modem 1200 can then adjust the spectral characteristics of its transmitter to compensate for the roll-off effects due to the land line 248. In a second embodiment, described with reference to the flowchart of FIG. 14, the transmitting modem dynamically adjusts the spectral characteristics of its transmitter and polls the receiving modem concerning the eye quality observed for a given spectral characteristic of the transmitter. Once each of the possible spectral characteristics of the transmitting modem has been used, the spectral characteristic resulting in the best eye quality at the receiving end is used for the duration of the call.

The method used in accordance with the first embodiment of the invention is described with reference to the block diagram of FIG. 12 and the flowchart of FIG. 13. As illustrated in FIG. 12, a fax modem 1200 corresponding to the modem 1000 in FIG. 10 is controlled by the PC system 260. The fax modem 1200 transmits data to and receives data from the central office 247 via a land line 248. The central office 247 makes various connections so that ultimately the fax modem 1200 is connected to the fax modem 210 (FIGS. 2 and 6) via a cellular telephone connection as was described above in connection with FIGS. 2 and 6. Prior to determining the data rate to the fax modem 210, the fax modem 1200 first determines the characteristics of the connection that it has made with the central office 247. This is accomplished by causing the control processor 1010 (see FIG. 10) within the fax modem 1200 to command the digital signal processor 1012 to transmit two signals (or one composite signal) to the central office 247 at a pair of predetermined frequencies which preferably are selected at the low and high ends of the normal frequency range of the signals used by the modem 1200 when transmitting data. For example, in one particularly preferred embodiment, a transmitted high frequency $f_{OH}$ signal is selected to be approximately 3,000 Hz, and a transmitted low frequency $f_{OL}$ signal is selected to be approximately 1,000 Hz. As illustrated in FIG. 12, the two signals are transmitted to the central office 247, and then the modem 1200 "listens" for an echo from the central office. Such an echo is always present in a land line telephone system. The echoes for the two signals will be at considerably lower amplitudes than the respective transmitted signals; however, by transmitting the two signals at the same amplitudes, the echoes for the two signals should be the same amplitude if the characteristics of the land line connection 248 are not frequency dependent. In typical land line connections, however, a high frequency roll-off is inherent in the telephone line 248. This roll-off is caused, for example, by the inductance of the telephone line 248 and other factors. By measuring the difference between the amplitudes of the echoed high frequency signal $f_{IH}$, and the echoed low frequency signal $f_{IL}$, the high frequency roll-off between 1,000 Hz and 3,000 Hz can be determined. In particular, using the echo of the low frequency signal $f_{IL}$ as a reference, the roll-off of the high frequency signal $f_{IL}$ can be determined.

It should be understood that the measured roll-off includes the roll-off along twice the length of the land line 248 (i.e., the roll-off in the transmission to the central office 247 and the roll-off in the echo from the central office 247). Thus, an approximation of the one-way transmission roll-off in the transmission path to the central office 247 may be obtained by reducing the measured two-way roll-off by onehalf. It should be understood that the necessary hardware and software for making these measurements are included as part of the digital signal processor 1012 within a conventional modem 1200; however, the measurements had previously not been performed in the manner described in accordance with the teachings of the present invention.

After performing the above-described measurement of the transmission path roll-off to the central office 247, the modem 1200 adjusts its internal filters by the amount of the calculated high frequency roll-off in order to compensate for the effects due to the loss over the line 248. For example, if it is desired to provide a transmitter in the cell site 225 (FIG. 2) with an input signal having a −6 dB/octave roll-off, and the measured two way roll-off of the land line 248 is −8 dB/octave, then the land line modem 1200 will adjust its transmit spectral characteristics to provide an adjustment of 4 dB/octave. Thus, if the conventional transmission filter in the land line side modem 1200 has been programmed to have a deemphasis (or roll-off) of −6 dB per octave prior to the implementation of the present invention, the roll-off will be changed to −2 dB per octave for this specific example. One skilled in the art will appreciate that the digital signal processor 1012 in a conventional high speed modem is configured to provide various filters in the transmission path, and that the required emphasis or deemphasis is readily provided by changing the appropriate filter coefficients of the digital signal processor 1012.

Figure 13:
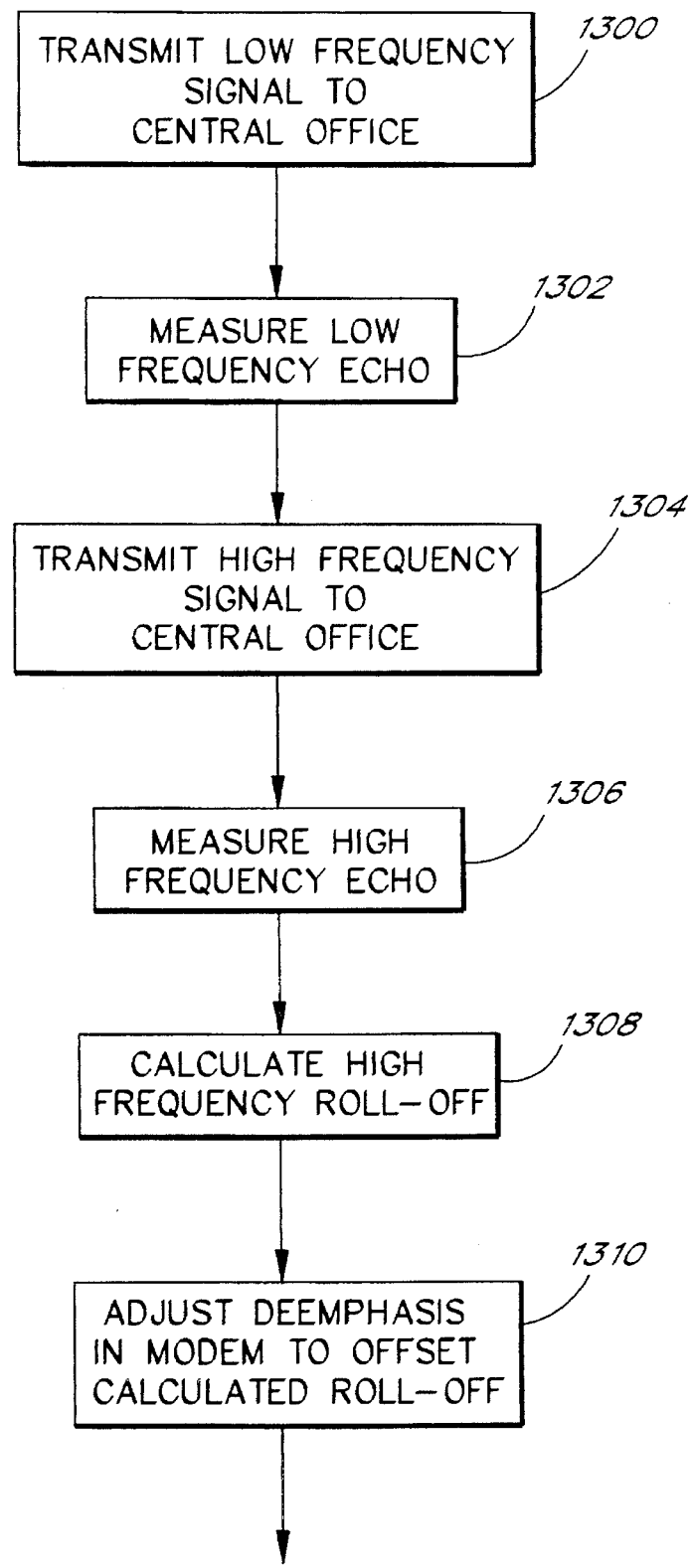
FIG. 13 illustrates a flow chart of one embodiment of the present invention which implements transmitter-end spectral shaping.

The foregoing is summarized in the flow chart of FIG. 13. In a process block 1300, the modem 1200 is caused to transmit a low frequency signal of predetermined amplitude to the central office 247. The modem 1200 then proceeds to a process block 1302 where the modem 1200 listens for the echo from the central office 247 and measures the amplitude of the received signal. Similarly, in a process block 1304, the modem 1200 is caused to transmit a high frequency signal of the same predetermined amplitude to the central office 247, and, in a process block 1306, the modem 1200 listens for the echo and measures the amplitude of the received signal. In a process block 1308, the modem 1200 then calculates the one-way roll-off as one-half the difference between the amplitudes of the two signals (i.e., roll-off =½ $\log_{10} (A_H/A_L)$ where $A_H$ is the measured amplitude of the high frequency signal $f_{IH}$, and $A_L$ is the measured amplitude of the lower frequency signal $f_{IL}$). In a process block 1210, the deemphasis in the filters of the modem 1200 is reduced by the amount of the calculated roll-off. Again, one skilled in the art will appreciate that processes 1300 and 1304 can be performed at the same time, and that processes 1302 and 1306 can also be performed at the same time by transmitting the high frequency signal $f_{OH}$ and the low frequency signal $f_{OL}$ at the same time.

The embodiment of FIGS. 10–15 operates without requiring interaction between the two modems, at least with respect to setting the roll-off characteristics of the modem connected to the land telephone line. Thus, one modem incorporating this embodiment of the present invention will operate even if the modem at the other end does not incorporate the improvement.

Figure 14:
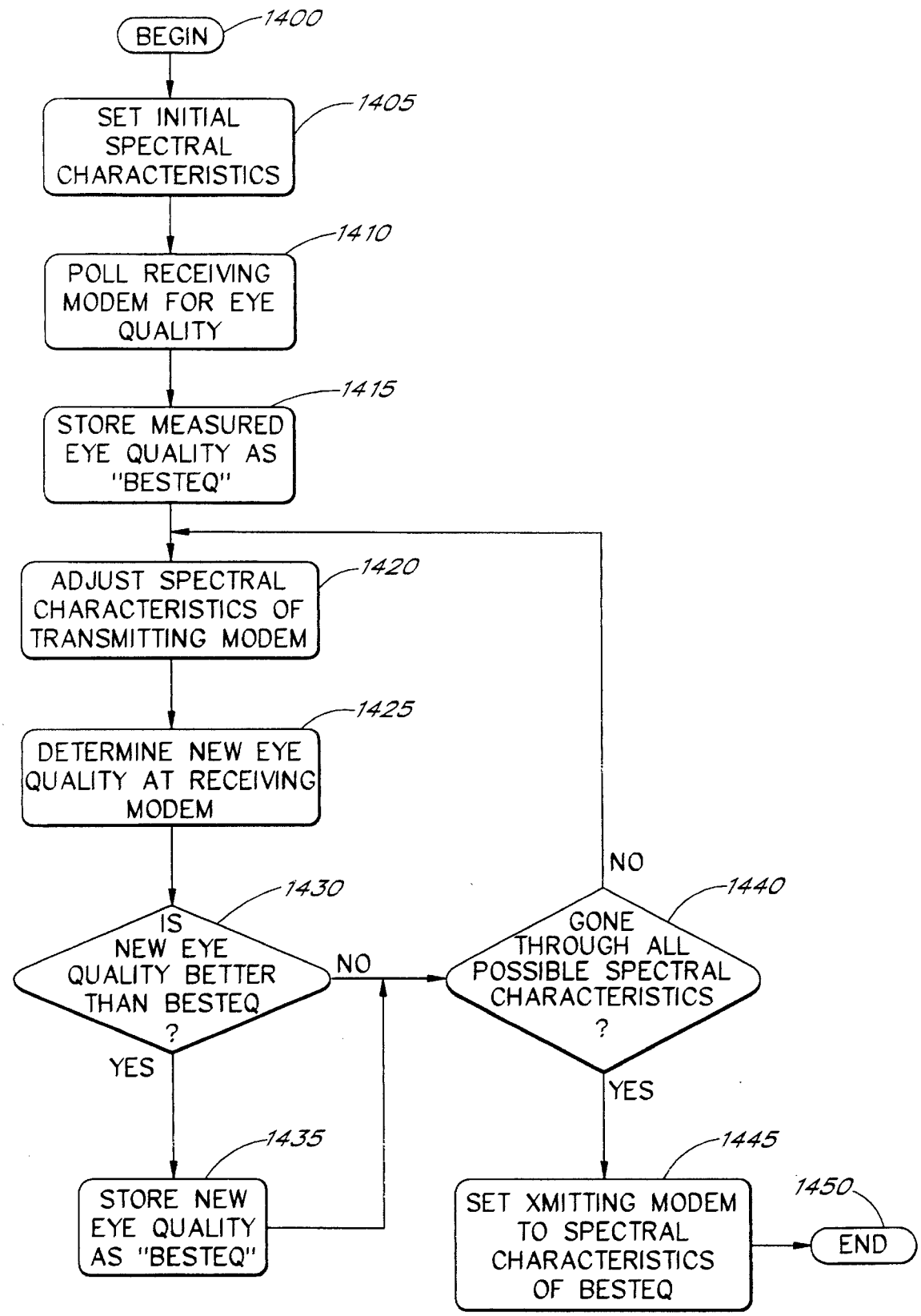
FIG. 14 illustrates a flow chart of a second embodiment of the present invention which implements transmitter-end spectral shaping.
Figure 15:
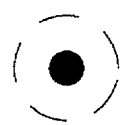
FIG. 15 illustrates an exemplary 16-point signal constellation which shows the deviation of the points in the received spectrum.
Figure 15:
Figure 15:
Figure 15:
Figure 15:
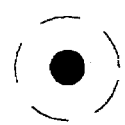
Figure 15:
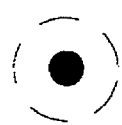
Figure 15:
Figure 15:
Figure 15:
Figure 15:
Figure 15:
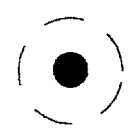
Figure 15:
Figure 15:
Figure 15:
Figure 15:
Figure 15:

FIGS. 10 and 14–15 illustrate the second embodiment wherein the spectral characteristics of the transmitting modem are adjusted dynamically based upon eye quality to compensate for losses in the land line 248. In known modems, part of the initial negotiating process involves setting the power level of each of the modems. In one modem protocol, the MNP-10 protocol, the modems initially transmit data patterns to each other while varying the overall power level. The power level which is selected in the MNP-10 protocol is that level at which the best eye quality is achieved in the receiving modem. FIG. 15 is an exemplary 16-point signal constellation which shows the deviation of the points in the received spectrum, as indicated by the dashed lines surrounding the points in FIG. 15. The smaller the eye is (i.e., the more closely the eye is to a single point), the better the signal is. Conventional modems, such as the Rockwell RC96DP and RC 144DP modems have built-in eye quality monitors which can be invoked to determine the eye quality of received signals. Thus, each modem invokes its eye quality monitor while the other modem adjusts its power level. When the modem measures its best eye quality, it signals the other modem to maintain that power level. If a satisfactory eye quality is not achieved, then the modems will step down to a lower data rate. As briefly discussed above, the power level can be adjusted by the digital signal processor 1012 (FIG. 10). Although the protocol employed in MNP-10 can be somewhat helpful in maximizing data transmission rates, such a protocol does not solve the essential problem resulting from frequency dependent nonlinearities. In contrast to the MNP-10 protocol, the present embodiment of the invention contemplates varying the spectral (i.e., frequency dependent) characteristics of the transmitting modem. That is, the spectral shape is altered to compensate for frequency dependent losses in the land line 248.

As detailed in FIG. 14, after initialization in a begin block 1400, the transmitting modem 1200 initially sets the transmission spectral characteristics as represented in a process block 1405 (e.g., the digital signal processor within the modem 1200 may be initially set so that the transmitted signal has a 6 dB/octave roll-off). The transmitting modem 1200 then polls the receiving modem in order to determine the eye quality observed by the receiving modem. This eye quality, which is normally represented as a numerical value, is stored under the variable name of BESTEQ, as represented in a process block 1415.

Once the first measured eye quality has been stored, the digital signal processor within the transmitting modem (i.e., the modem 1200 when communication is from the modem 1200 to the modem 210, or the modem 210 when communication is from the modem 210 to the modem 1200) dynamically adjusts the spectral characteristics of the transmitted signal as indicated in a process block 1420. For example, the transmitted signal may be adjusted to have a frequency roll-off of 5 dB/octave instead of the initial 6 dB/octave roll-off. It will be appreciated, of course, that spectral shaping other than that of a simple low pass filter may be implemented by the digital signal processor, and the actual spectral shaping characteristics of the transmitting modem may depend upon the particular application. Once a new frequency roll-off is determined, the new eye quality value at the receiving modem is determined and sent to the transmitting modem, as represented in a process block 1425.

The transmitting modem then determines if the new eye quality is better than the best previous eye quality, as represented in a decision block 1430. Since the eye quality is typically represented by a numerical value where a higher value represents a better eye quality, the value of the new eye quality can be compared to the value of BESTEQ to determine which is the better eye quality. If the value of the new eye quality is greater than the value of BESTEQ, then the value of BESTEQ is replaced by the value of the new eye quality as represented in a process block 1435. If the new eye quality value is not greater than the value of BESTEQ, then BESTEQ retains its original value.

After the best eye quality value BESTEQ has been determined, the transmitting modem determines whether or not each of the possible spectral characteristics has been used to determine eye quality, as represented in a decision block 1440. Thus, if the transmitting modem is set, for example, to increment from −10 dB/octave up to +3 dB/octave by increments of 1 dB/octave, then 14 different spectral characteristics will be tested before a determination is made about which spectral characteristic results in the optimum eye quality. If the transmitting modem has not yet incremented through all the possible spectral characteristics, then the method of the present invention returns to the process block 1420 and a new spectral characteristic is tested. Once the transmitting modem has incremented through all of the desired spectral characteristics, the transmitting modem uses the spectral characteristic which results in the best eye quality (i.e., the characteristics corresponding to the value of BESTEQ) for the remainder of the call, as represented in a process block 1445. The method is thus completed in an end block 1450, wherein a data transmission rate is determined and data transmission commences.

Auto-equalization and Dynamic Amplitude Thresholding

Under another aspect of the present invention illustrated in FIGS. 16–20, a single point solution to the problems encountered in transmitting digital data over cellular communication channels is contemplated. The present solution is implemented within the digital signal processor at the receiving modem, and does not require communication between the two modems to be implemented.

As is well understood in the art, at initialization of the two modems (i.e., before data transfer begins), a number of coefficients implemented in a shift and delay circuit (auto-equalizer) are calculated within the digital signal processor during the initial training sequence. These coefficients are used to compensate for the frequency response of the communications channel over which the signal is to be transmitted. By knowing the frequency response of the communications channel, the received signal may be digitally processed to compensate for deleterious effects introduced during transmission of the data signal. Thus, these coefficients are coarse estimates of the values needed to provide optimum resolution in the signal constellation. After the initial training process, wherein the initial coarse values of the coefficients are calculated, the coefficients are continuously updated based upon the observed eye quality at the receiving modem. This continuous updating is commonly referred to as auto-equalization and serves as a kind of fine tuning which insures optimum signal constellation resolution.

The conventional method used in the digital signal processor to continuously update new values of the coefficients works well as long as no non-linear distortion is introduced along the communications channel. However, once some non-linear distortion is introduced, the efficacy of the conventional method to calculate accurate coefficient values diminishes drastically. Thus, when non-linear distortion such as clipping caused by a limiter device along the communications channel is introduced, erroneous coefficients are calculated. In accordance with this aspect of the present invention, it is desirable to eliminate the deleterious effects observed in the calculation of coefficients due to clipping. Thus, those constellation points which are likely to be clipped will not be factored into the calculation of the coefficient values to insure a more accurate representation of the frequency response over the communications channel. The method used to accomplish this will be described in greater detail below.

Figure 16:
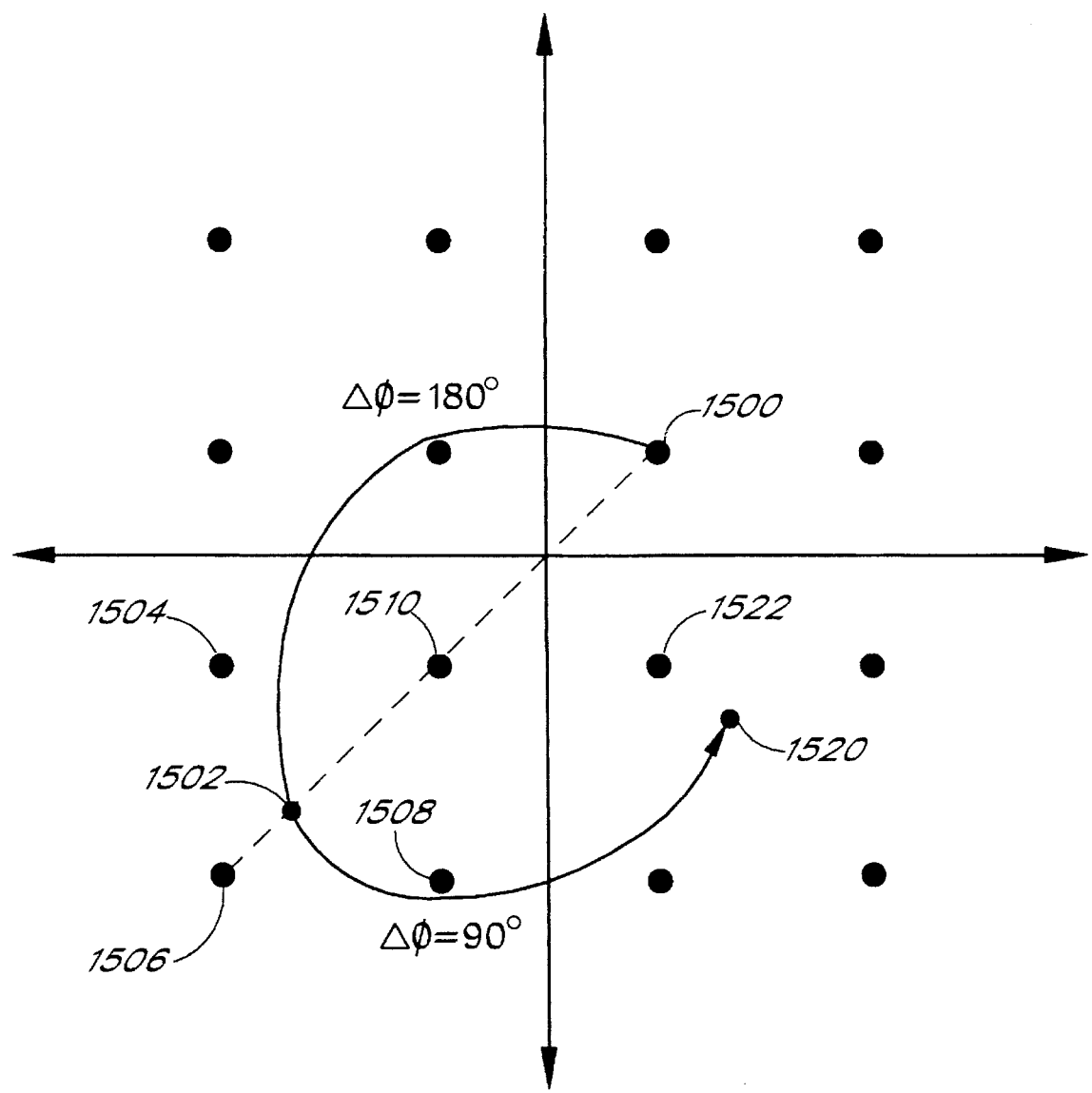
FIG. 16 illustrates the 16-point signal constellation of FIG. 15 showing the errors in the calculated received points caused by amplitude errors.

As discussed above, one of the deficiencies of transmitting digital data on an analog cellular telephone system is the clipping which occurs on high frequency components of the transmitted signals. This clipping causes the amplitudes of high frequency signals to be non-linearly attenuated. When a high frequency component of a signal is caused by a large phase change between two points on the modem signal constellation, such a high frequency component is likely to be clipped (i.e., since the high frequency components of the transmitted signals are normally amplified by the preemphasizer within the transmitter). Thus, the measured amplitude of the second point will be considerably less than the expected amplitude. That is, the receiving modem will measure the phase change and amplitude of the second point and compare the measured phase change and amplitude with the phase changes and amplitudes of all the possible points in the constellation and select the possible point closest to the measured point. This is illustrated in FIG. 16 wherein the previous point was a point 1500. The current measured point 1502 is compared to the surrounding points 1504, 1506, 1508 and 1510 and is determined to be closest to the point 1506. Thus, the data for this measurement is determined to be the data that would result in a phase change and amplitude from the previous point 1500 to the point 1506. It can be seen that the phase change is approximately 180° which results in a high frequency signal transition and thus results in clipping such that the measured amplitude of the point 1502 is considerably less than the expected amplitude of the point 1506.

The eye quality monitor of the receiving modem considers this to be an unacceptable deviation from an ideal eye pattern and would indicate that the coefficients in the digital signal processor should be recalculated to increase the amplitude of points reached after such large phase changes. Of course, one can readily see that the amplitude value of the point 1502 is too small as a result of two factors. First, the amplitudes of signals having high frequency components are attenuated linearly over the communications channel. This attenuation is due to the frequency response of the communications channel. Therefore, if this were the only cause of decreased amplitude of the constellation point 1502, then the calculated coefficients would accurately reflect the frequency response of the communications channel. However, a second factor also decreases the amplitude of the constellation point 1502. Namely, clipping caused by the limiter in the transmission circuit introduces a non-linear decrease in the amplitude of the signal. Thus, when the amplitude decrease caused by clipping is factored into the coefficient values, an inaccurate representation of the frequency response of the communications channel results. Thus, when the newly calculated coefficient values are used to scale the constellation points of the smaller amplitude, or lower frequency component signals (i.e., the signals which are not likely to be clipped) these constellation points are placed too far out, and resolution of the constellation is compromised. For example, if the next measured point in the constellation is a point 1520 which results from a relatively small frequency change and from a relatively small amplitude, there would be little if any clipping. Thus, the changed coefficients would have the effect of increasing the amplitude of the measured point 1520 relative to the amplitude of the expected point 1522. Although the modem would select the correct point 1522 to represent the current data, the modem would once again determine that the eye quality is not acceptable, and would again change the coefficients to decrease the amplitudes of the measured signals. This cycle is constantly repeated resulting in erroneous coefficient values and low resolution of the signal constellation.

In a conventional land line phone system which does not have a frequency dependent dynamic range limiter and, thus, does not have the clipping phenomenon, the continuous recalculation of coefficients will eventually result in mutually satisfactory eye patterns under normal operating conditions. However, because of the non-linearity introduced by the clipping of high frequency signals, the two modems operating on a cellular telephone system will continue to "hunt" for a satisfactory combination of filter coefficients to provide a satisfactory eye pattern, and will never find a satisfactory combination.

The foregoing problem can be solved using a method in accordance with the teachings of the present invention which modifies the operation of the equalization algorithm normally employed by the digital signal processor. In particular, the hunting phenomenon has been shown herein to be caused by the two modems attempting to resolve an unresolvable problem with respect to clipped signals. Since clipped signals are generally those which have a large amplitude, or a large phase transition, or both, in accordance with the present invention, these signals are not factored into the calculation of the coefficients in the digital signal processor of the receiving modem. In particular, the equalization algorithm is modified to ignore errors measured for points at which clipping is expected. For example, in one application, where only the constellation points on the outer periphery of the constellation that follow a large phase change are expected to clip, all small amplitude signals, as well as all large amplitude signals which follow a small phase transition, are used to determine the coefficients for the auto-equalizer. Although the eye quality monitor will ignore the points having a large phase change and a large amplitudes with respect to the calculation of new coefficients, the fact that the points did result from such a combination is taken into consideration in determining which of the possible constellation points is represented by the measured point. In particular, referring again to FIG. 16, when the measured point 1502 has a large amplitude following a large phase change, the present invention will always consider the measured point 1502 to correspond to the point 1506 by applying a multiplication factor to the measured amplitude. Thus, when the measured point is compared to the possible points, it will be considered as corresponding to the outer point on the constellation.

Figure 17:
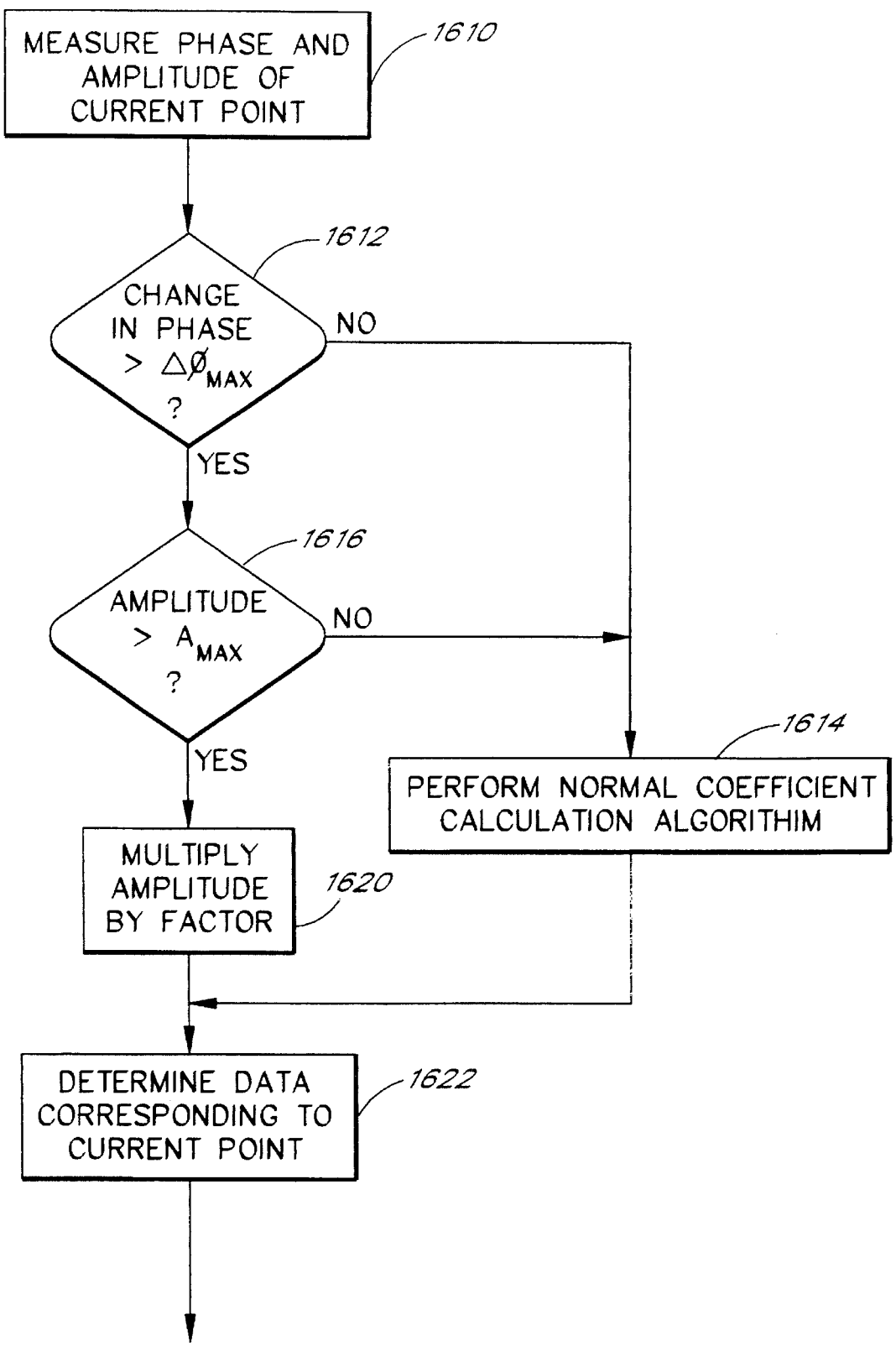
FIG. 17 illustrates a flow chart of an embodiment of the present invention which implements improved auto-equalization at the receiving modem when used in combination with an analog radio communication system.

The foregoing can be understood by referring to FIG. 17 which is a flow chart of the pertinent portions of the operation of the digital signal processor within a modem constructed in accordance with the present invention. As illustrated in FIG. 17, the digital signal processor within the receiving modem measures the phase and amplitude of the current point in a process block 1610. Thereafter, in a decision block 1612, the digital signal processor compares the difference between the current phase and the previous phase to determine whether the change in phase is greater than a maximum change of phase ($\Delta\phi_{MAX}$). The maximum change of phase is a change of phase that is not likely to cause high frequency components that are preemphasized and then clipped. The maximum change of phase may be set to, for example, 135° in one embodiment. If the phase change is not greater than $\Delta\phi_{MAX}$, then it is unlikely that the combination of preemphasis and clipping in the cellular system caused the amplitude to be reduced. Thus, the offset of such a data point from the ideal constellation point is factored into the coefficient calculation employed by the auto-equalization algorithm, as indicated by a process block 1614. On the other hand, if, in the decision block 1612, the digital signal processor determines that the phase change is greater than $\Delta\phi_{MAX}$, then the digital signal process compares the measured amplitude of the current point to a predetermined maximum amplitude $A_{MAX}$ in a decision block 1616 to determine whether the measured amplitude is greater than $A_{MAX}$. If the measured amplitude is not greater than $A_{MAX}$, then the digital signal processor performs the normal coefficient calculation routine in the process block 1614, as before. On the other hand, if the measured amplitude is greater than $A_{MAX}$, then the digital signal processor bypasses the coefficient calculation process block 1614 and executes a process block 1620 wherein the measured amplitude of the current point is multiplied by a factor to adjust the point to the value that it should have had but for the clipping. The factor can be determined empirically during the original training process and can vary in accordance with the measured change in phase between the current point and the previous point. For example, a first signal representing a phase change of 180° will likely have higher frequency components than a second signal representing a phase change of 150°, and may thus be preemphasized more than the second signal. Therefore, a separate factor can be calculated for each phase change. On the other hand, in some systems, a single factor can be calculated for all relatively large phase changes.

It should be understood from the foregoing that the amplitude errors caused by large changes in phase are not permitted to cause an error which results in lower eye quality monitor and thus do not cause a step down in data transmission rate due to low constellation resolution. On the other hand, amplitude and phase errors caused by the frequency response of the land line 248 will continue to be detected and corrected as if the two modems were conventionally connected via land lines only.

Figure 18:
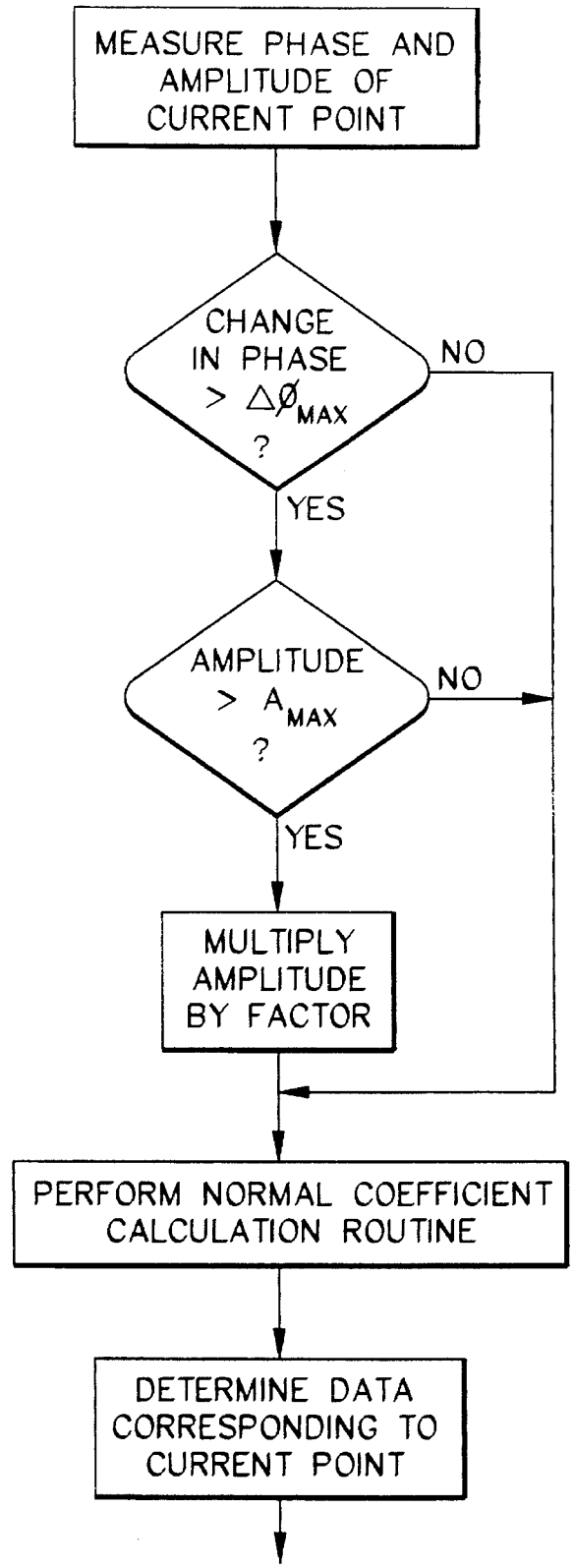
FIG. 18 illustrates a flow chart of an alternative embodiment of the invention of FIG. 17 wherein the coefficient calculation routine is executed for each measurement of phase and amplitude of a current received data point.

As a further alternative, the coefficient calculation routine can be executed each time as illustrated in FIG. 18. The coefficient calculation routine either receives the original phase change and amplitude information, or, if the amplitude and phase changes are both greater than their respective maximum acceptable values, the coefficient calculation routine uses the value modified by the process block 1620.

It can be seen that this aspect of the present invention can be readily implemented by modifying the digital signal processor routines or by modifying the control processor routines that control the digital signal processor. In either case, no significant changes to the hardware itself are required.

Figure 19:
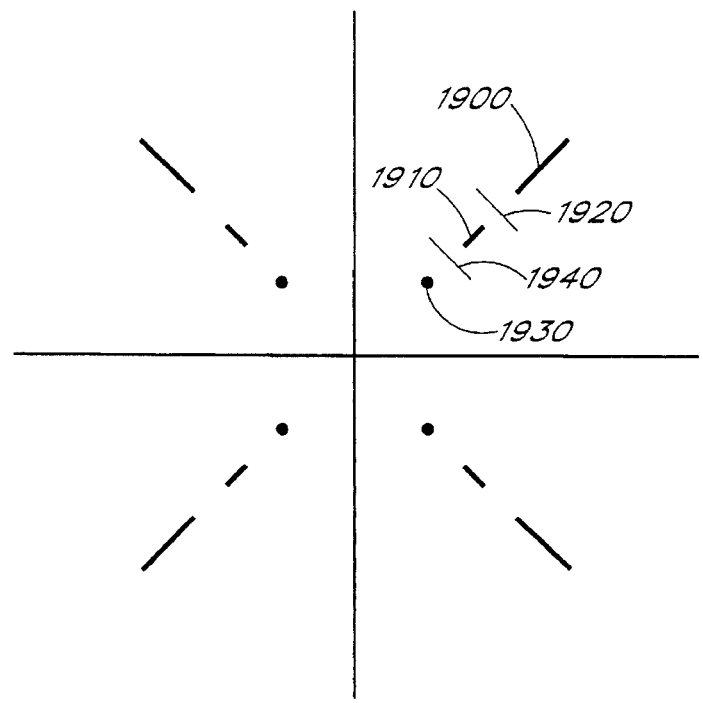
FIG. 19 illustrates an exemplary signal constellation wherein the amplitudes of the middle and outer points have significant amplitude variations.
Figure 20:
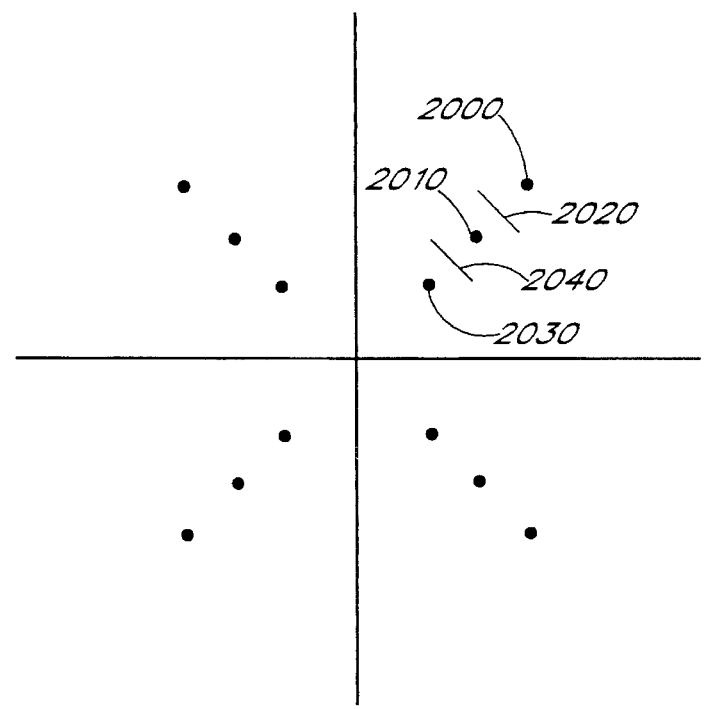
FIG. 20 illustrates an ideal signal constellation wherein the amplitude threshold levels are selected to be approximately half way between the ideal points of the constellation.

Although the technique described above significantly enhances constellation resolution, the outer (i.e., large amplitude) points of the constellation are still likely to exhibit amplitude variations disproportionately to the inner constellation points. For example, a constellation, which is shown here only for illustrative purposes and does not necessarily correspond to any actual modulation scheme, shown in FIG. 19 shows the outer points with more severe amplitude variations, while FIG. 20 shows the ideal constellation. According to normal techniques, the determination of whether a data point belongs to one constellation point or another depends upon a threshold value placed half way between the ideal constellation points. Thus, according to the conventional method, a data point on the outside of a threshold 2020 placed half way between the ideal points 2000, 2010 is considered to belong to the point 2000. The case is similar with the threshold 2040 placed half way between the ideal points 2010, 2030.

In accordance with the teachings of the present invention, however, improved constellation resolution is achieved by means of dynamic amplitude threshold calculation. When calculating the amplitude threshold value in accordance with the present invention, the large amplitude variation in the outer constellation points is taken into account. Specifically, referring to FIG. 19, one will appreciate that data points belonging to an outer eye 1900 are closer to the half way point between the ideal constellation points than the data points belonging to a middle eye 1910. The case is similar for the middle eye 1910 and an inner eye 1930. Thus, the dynamic amplitude threshold 1920 is placed closer to the eye 1910, and the amplitude threshold 1940 is placed closer to the eye 1930 to insure that the data points are assigned to the correct constellation points. In one particular embodiment, the standard deviation of the eye 1900 from the ideal constellation point is measured and the standard deviation of the middle eye 1910 from the ideal constellation point is also measured. These deviations are indications of the amplitude variations of the eyes 1900, 1910. The ratio of these standard deviations may be used as the ratio between the distance from the ideal outer constellation point to the threshold and the distance from the threshold to the middle constellation point. Thus, a more accurate determination of the appropriate constellation point assignments can be made in accordance with the teachings of the present invention.

One skilled in the art will recognize that the teachings of the present invention may be embodied in a variety of different ways according to the specific application without departing from the essence and spirit of the invention. For example, although the present invention has been described primarily with reference to an analog cellular communication system, the teachings of the present invention apply broadly to most or all radio frequency communication systems which include pre-emphasis and limiting functions. In addition, a processor within the modem bank 240, or other digital processing devices, may analyze the received signal and perform digital signal processing in accordance with the known characteristics of the limiter 150 so as to compensate for distortion introduced by the limiter 150. Furthermore, the pre-emphasis circuit within the cellular telephone 220, and the de-emphasis circuit within the cell site 225 could be deactivated. Also the structure or programming of the limiter 150 could be modified to maintain a constant gain level. Therefore, it will be understood that the foregoing description is merely illustrative and not restrictive. Rather the spirit and scope of the invention should be interpreted in light of the appended claims.

I claim:

1. A method of compensating for varying spectral characteristics of data signals received by a receiving modem from a transmitting modem via an analog communications link wherein said data signals comprise amplitude and phase modulation of at least one carrier signal, said amplitude and phase modulation defining a signal constellation at said receiving modem wherein predetermined points on said signal constellation represent combinations of binary data, said signal constellation including points having varying phases and amplitudes that differ from phases and amplitudes of said predetermined points in the presence of non-ideal spectral characteristics of said communication link between said transmitting modem and said receiving modem, said non-ideal spectral characteristics including non-linear amplitude limiting of portions of said data signals, said method comprising the steps of:

generating at said receiving modem said data signal constellation to provide a first plurality of data points having respective amplitudes and phases;

detecting at said receiving modem a second plurality of points included in said first plurality of points having amplitudes that differ sufficiently from said predetermined points to indicate that amplitudes of data signals that generated said second plurality of points have been nonlinearly limited;

calculating in said receiving modem spectral shaping coefficients for use by said receiving modem using amplitude measurements from a third plurality of points that are included in said first plurality of points but not included in said detected second plurality of points; and modifying in said receiving modem spectral shaping characteristics of said receiving modem using said calculated spectral shaping coefficients so that said third plurality of points have phases and amplitudes that more closely correspond to phases and amplitudes of said predetermined points.

2. The method as defined in claim 1, wherein said first points are detected sequentially in time, and wherein said step of calculating spectral shaping characteristics further includes the step of multiplying said amplitude of one of said second plurality of points by a factor that varies in accordance with a phase change between said one of said second plurality of points and an immediately preceding one of said first plurality of points to generate a modified amplitude, said modified amplitude being used to calculate said spectral shaping characteristics.

3. The method as defined in claim 1, wherein said first points are detected sequentially in time, and wherein said step of calculating spectral shaping characteristics further includes the step of multiplying said amplitude of one of said second plurality of points by a factor that varies in accordance with a phase change between said one of said second plurality of points and an immediately preceding one of said first plurality of points to generate a modified amplitude and in accordance with said amplitude of said one of said second plurality of points, said modified amplitude being used to calculate said spectral shaping characteristics.

4. A method of establishing amplitude thresholds in a data signal constellation of a receiving modem that receives data signals from a transmitting modem via an analog communications link, wherein said data signals comprise amplitude and phase modulation of at least one carrier signal, said amplitude and phase modulation defining said data signal constellation at said receiving modem wherein predetermined points on said data signal constellation represent combinations of binary data, said receiving modem establishing a plurality of amplitude thresholds on said data signal constellation between points having like phases and different amplitudes wherein a point having an amplitude less than one of said thresholds is recognized by said receiving modem as a first data combination and wherein a point having an amplitude greater than said one of said thresholds is recognized as a second data combination, said plurality of amplitude thresholds being substantially midway between amplitudes of adjacent points at like phases, said data signal constellation including points having varying phases and amplitudes that differ from phases and amplitudes of said predetermined points in the presence of non-ideal spectral characteristics of said communication link, said non-ideal spectral characteristics including non-linear amplitude limiting of portions of said data signals, said method comprising the steps of:

measuring in said receiving modem amplitudes and phase changes for known data combinations having predictable predetermined amplitudes and phase changes;

based upon said measured phase changes, setting in said receiving modem a range of amplitudes for each predictable amplitude for each phase change, each range having an upper limit and a lower limit;

for each measured phase change, establishing in said receiving modem a respective new threshold value for said each predictable predetermined amplitude so that said new threshold value is below the lower limit of said range of amplitudes for said predictable predetermined amplitude and above the upper limit of said range of amplitudes for an adjacent point at a lower predictable predetermined amplitude; and using said new threshold values in said receiving modem when receiving unknown data from said transmitting modem to determine which of said predetermined points is represented by said unknown data.

5. A method of discriminating data points in a signal constellation, said signal constellation having ideal inner and outer points at various phases and amplitudes, said constellation having a configuration depending upon the data exchange rate between a transmitting modem and a receiving modem, said transmitting modem and said receiving modem communicating over a communication link having non-ideal characteristics resulting in amplitude deviations of said data points from said ideal inner and outer points, said method comprising the steps of:

receiving data signals having phase and amplitude characteristics transmitted from said transmitting modem;

defining at said receiving modem a signal constellation configuration having inner and outer ideal points corresponding to lesser and greater amplitudes, respectively, at various phase angles;

assigning at said receiving modem data point positions in said signal constellation to said data signals based upon said phase and amplitude characteristics;

measuring at said receiving modem said phase and amplitude characteristics of said received data signals to generate measured inner and outer points;

calculating at said receiving modem said amplitude deviations of said measured inner and outer points from said ideal inner and outer points;

dynamically adjusting at said receiving modem an amplitude threshold value between said measured inner and outer points based upon the measured amplitude deviations of said measured inner and outer points from said ideal inner and outer points to generate adjusted thresholds; and assigning at said receiving modem data points of incoming data to ideal constellation points based upon said dynamically adjusted thresholds.

6. The method as defined in claim 5, wherein each of said dynamically adjusted thresholds is selected so that a ratio of an amplitude difference between a respective ideal inner point and said threshold to an amplitude difference between said threshold and a respective ideal outer point is substantially equal to a ratio between a standard deviation of said measured inner data points from said ideal inner point to a standard deviation of said measured outer data points from said ideal outer point.

7. The method as defined in claim 5, further comprising the step of receiving at said receiving modem known data from said transmitting modem prior to said measuring step so that said ideal inner points and said ideal outer points are predictable.

8. A method of compensating for varying spectral characteristics of data signals received by a receiving modem from a transmitting modem via an analog communications link wherein said data signals comprise amplitude and phase modulation of at least one carrier signal, said amplitude and phase modulation defining a signal constellation at said receiving modem wherein predetermined points on said signal constellation represent combinations of binary data, said signal constellation comprising outer points and inner points, said outer points having greater amplitudes than said inner points, said signal constellation including points having varying phases and amplitudes that differ from phases and amplitudes of said predetermined points in the presence of non-ideal spectral characteristics of said communication link between said transmitting modem and said receiving modem, said non-ideal spectral characteristics including non-linear amplitude limiting of portions of said data signals, said method comprising the steps of:

generating said data signal constellation in said receiving modem to provide a first plurality of data points having respective amplitudes and phases, said first plurality of points comprising said inner and outer points;

identifying in said receiving modem a second plurality of said first plurality of points, said second plurality of points comprising selected ones of said outer points resulting from phase changes greater than a selected phase change, said second plurality of points having amplitudes likely to have been limited;

identifying in said receiving modem a third plurality of points, said third plurality of points comprising points included in said first plurality of points but not included in said second plurality of points; and performing in said receiving modem auto-equalization on said data signals, said auto-equalization using coefficients predicated upon error signals primarily derived from said third plurality of points.

\* \* \* \* \*